(12) United States Patent
Klein et al.

(10) Patent No.: US 10,761,569 B2
(45) Date of Patent: Sep. 1, 2020

(54) LAYOUT FOR A TOUCH INPUT SURFACE

(71) Applicant: Microsoft Technology Licensing, LLC, Redmond, WA (US)

(72) Inventors: Christian Klein, Duvall, WA (US); Roy Henry Berger, Jr., Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 60 days.

(21) Appl. No.: 15/897,113

(22) Filed: Feb. 14, 2018

(65) Prior Publication Data

US 2019/0250666 A1 Aug. 15, 2019

(51) Int. Cl.
| | |
|---|---|
| *G06F 1/16* | (2006.01) |
| *G06F 3/0354* | (2013.01) |
| *G06F 3/0488* | (2013.01) |
| *G06F 3/041* | (2006.01) |
| *G06F 3/01* | (2006.01) |

(52) U.S. Cl.
CPC .......... *G06F 1/1643* (2013.01); *G06F 1/1616* (2013.01); *G06F 3/016* (2013.01); *G06F 3/03547* (2013.01); *G06F 3/0412* (2013.01); *G06F 3/0488* (2013.01); *G06F 3/04886* (2013.01); *G06F 3/03545* (2013.01); *G06F 2203/04808* (2013.01)

(58) Field of Classification Search
CPC ............................................ G06F 2203/04808
See application file for complete search history.

(56) References Cited

U.S. PATENT DOCUMENTS

| | | |
|---|---|---|
| 2006/0238517 A1 | 10/2006 | King et al. |
| 2008/0242359 A1 | 10/2008 | Seol et al. |
| 2009/0153470 A1 | 6/2009 | Chen et al. |
| 2010/0033438 A1* | 2/2010 | Fu .......................... G08C 17/02 345/173 |
| 2010/0328260 A1* | 12/2010 | Chiu ....................... G06F 3/044 345/174 |
| 2011/0080348 A1 | 4/2011 | Lin et al. |
| 2011/0141047 A1 | 6/2011 | Iwaizumi et al. |
| 2011/0159928 A1 | 6/2011 | Nii |
| 2011/0285631 A1 | 11/2011 | Imamura et al. |
| 2012/0162083 A1 | 6/2012 | Zhu |

(Continued)

FOREIGN PATENT DOCUMENTS

| | | |
|---|---|---|
| EP | 2328064 A2 | 6/2011 |
| EP | 2720132 A2 | 4/2014 |

(Continued)

OTHER PUBLICATIONS

"International Search Report and Written Opinion Issued in PCT Application No. PCT/US19/013896", dated May 27, 2019, 49 Pages.

*Primary Examiner* — Gustavo Polo

(57) ABSTRACT

Techniques for layout for a touch input surface are described. Generally, the described techniques enable a touch input surface and/or combination of touch input surfaces to be characterized as a single logical input surface. Based on different contextual factors, the single logical input surface can be divided into different touch input zones that can each receive touch input to invoke a different respective functionality. In at least some implementations, different haptic effects can be output to correspond to different touch input zones.

20 Claims, 20 Drawing Sheets

(56) References Cited

U.S. PATENT DOCUMENTS

| | | |
|---|---|---|
| 2013/0214995 A1 | 8/2013 | Lewin et al. |
| 2013/0219303 A1 | 8/2013 | Eriksson et al. |
| 2014/0002339 A1 | 1/2014 | Guard |
| 2014/0043254 A1* | 2/2014 | Goldbaum ............ G06F 3/0414 345/173 |
| 2014/0078086 A1 | 3/2014 | Bledsoe et al. |
| 2014/0289668 A1 | 9/2014 | Mavrody |
| 2014/0292697 A1 | 10/2014 | Morishita |
| 2014/0306899 A1 | 10/2014 | Hicks |
| 2015/0169080 A1 | 6/2015 | Choi et al. |
| 2017/0031588 A1 | 2/2017 | Berger et al. |
| 2017/0139479 A1 | 5/2017 | Shimotani et al. |
| 2017/0220307 A1 | 8/2017 | Da silva ramos et al. |
| 2017/0293373 A1 | 10/2017 | Miller et al. |
| 2017/0344215 A1 | 11/2017 | Zhang |

FOREIGN PATENT DOCUMENTS

| | | |
|---|---|---|
| EP | 2728445 A2 | 5/2014 |
| EP | 3179358 A1 | 6/2017 |
| WO | 2014182117 A1 | 11/2014 |
| WO | 2015012789 A1 | 1/2015 |
| WO | 2016053901 A1 | 4/2016 |

\* cited by examiner

LAYOUT FOR A TOUCH INPUT SURFACE

BACKGROUND

Modern computing devices utilize a variety of different types of input to enable interaction between users and devices. One particularly intuitive type of input is touch input. For instance, a user can provide touch input to a touch input surface (e.g., a touchpad, a touchscreen, and so forth) to interact with a computing device, such as for object selection, object manipulation, and so forth. Typical touch input implementations, however, are static and simply provide a single-purpose touch input experience, such as for manipulating a cursor via a touchpad, or for direct touch to objects displayed on a touchscreen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for layout for a touch input surface are described. Generally, the described techniques enable a touch input surface and/or combination of touch input surfaces to be characterized as a single logical input surface. Based on different contextual factors, the single logical input surface can be divided into different touch input zones that can each receive touch input to invoke a different respective functionality. In at least some implementations, different haptic effects can be output to correspond to different touch input zones.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for layout for a touch input surface are described. Generally, the described techniques enable a touch input surface and/or combination of touch input surfaces to be characterized as a single logical input surface. Based on different contextual factors, the single logical input surface can be divided into different touch input zones that can each receive touch input to invoke a different respective functionality. Further, when a context change occurs, the logical input surface can be reconfigured into a different arrangement of touch input zones.

For instance, consider a computing device that includes a touchpad input device. According to techniques described herein, the touchpad can be characterized as a single logical input surface that can be divided into different touch input zones dependent on a particular context. For instance, when an operating system or other system process is in focus, the touchpad can be configured into different zones based on a particular zone layout defined for the operating system. When an application is in focus, however, the touchpad can be configured into a different arrangement of touch input zones, such as defined by the application and/or for the application. As detailed below, a variety of different context information can be leveraged to determine how to configure a touch input surface. Further, a variety of different types and combinations of touch input surfaces can be leveraged to create an array of different touch input surface configurations.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
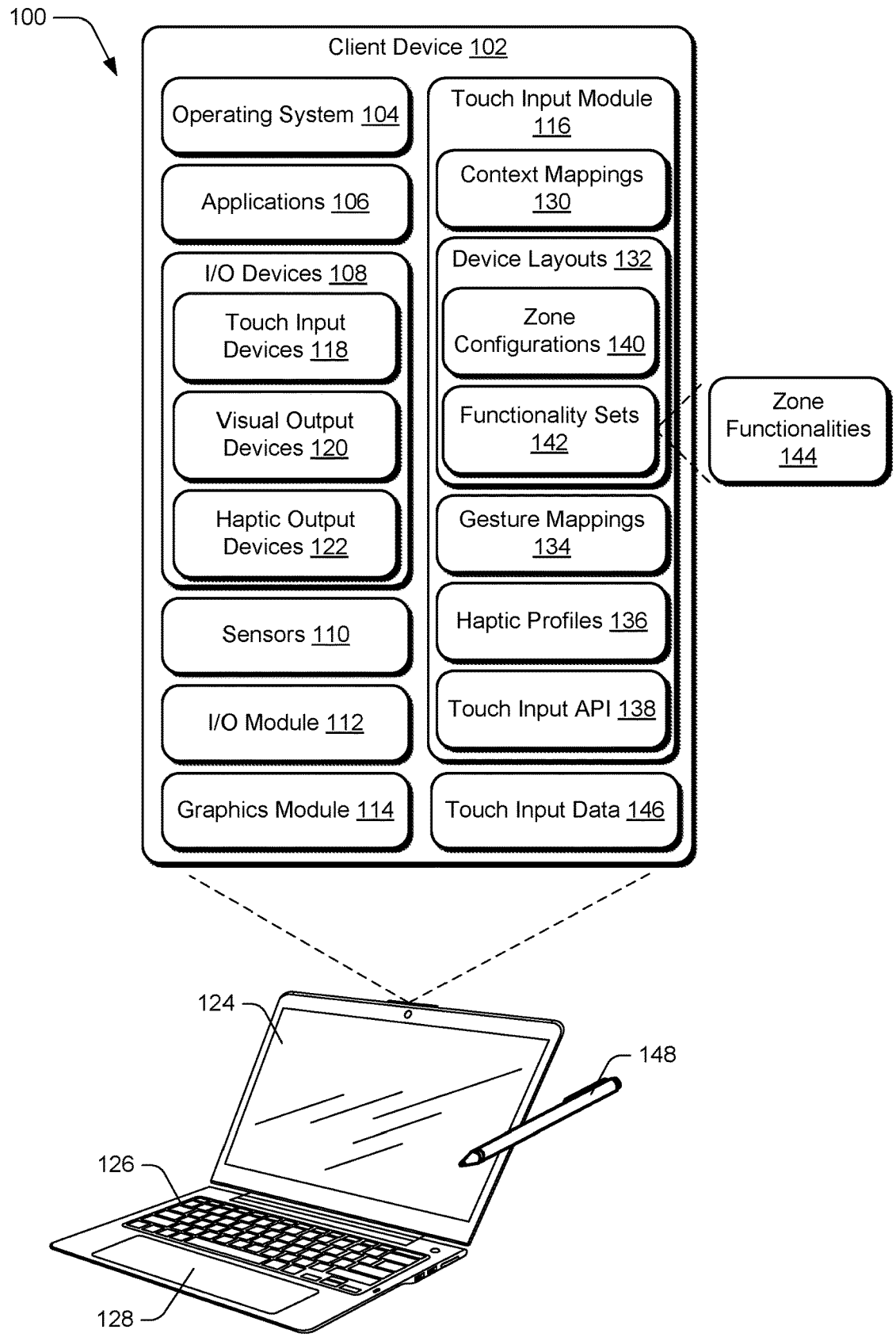
FIG. 1 is an illustration of an environment in an example implementation that is operable to employ techniques discussed herein.

FIG. 1 is an illustration of an environment 100 in an example implementation that is operable to employ techniques for layout for a touch input surface described herein. The environment 100 includes a client device 102, which may be configured in a variety of ways, such as a traditional computer (e.g., a desktop personal computer, laptop computer, and so on), a mobile device (e.g., a smartphone, a tablet device, and so on), an entertainment appliance, a wearable device, a game console, and so forth.

The client device 102 includes a variety of different functionalities that enable various activities and tasks to be performed. For instance, the client device 102 includes an operating system 104, applications 106, input/output ("I/O") device 108, sensors 110, an input/output ("I/O") module 112, a graphics module 114, and a touch input module 116. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represent functionalities for performing different tasks via the client device 102. Examples of the applications 106 include a word processing application, a spreadsheet application, a web browser, a gaming application, a communication application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The I/O devices 108 are representative of different functionalities for receiving input to the client device 102 and/or for providing output from the client device 102. Particular instances of the I/O devices 108, for example, represent a dedicated input device, a dedicated output device, or a device that both receives input and provides output. The I/O devices 108 include touch input devices 118, visual output devices 120, and haptic output devices 122. The touch input devices 118 are representative of functionality for receiving touch input to the client device 102. Generally, touch input can include direct contact by a user such as using a finger and/or combination of fingers. Touch input can also include input using a touch input device, such as a stylus or a digital pen ("pen").

The visual output devices 120 are representative of functionality for visual output for the client device 102. The visual output devices 120 can include functionality for direct visual output by the client device 102 (e.g., a display screen), and/or functionality for communicating visual data from the client device 102 to a different device to be displayed. For instance, graphics generated by the client device 102 can be communicated via a wireless and/or wired connection to a different device (e.g., a remote display screen or other client device) for display by the different device.

The haptic output devices 122 are representative of devices that are configured to provide haptic output. The haptic output devices 122, for instance, are configured to provide a haptic response to touch input which is tactilely-perceptible. Generally, the haptic output devices 122 may utilize a variety of different haptic-generating mechanisms to generate a haptic response, such as electrostatic force, a motor, magnets, linear resonant actuators (LRAs) (magnetic and/or piezo based), piezo-electric structures, and so forth.

Specific examples of the I/O devices 108 include a display device 124, a keyboard 126, and a touchpad 128. The display device 124 is configured to provide visual output for the client device 102. In at least one implementation, the display device 124 is configured as a touchscreen device. In a touchscreen implementation, for example, the display device 124 is not only configured to provide visual output, but can also receive touch input. Thus, in a touchscreen implementation, the display device 124 represents an instance of a touch input device 118 and a visual output device 120.

The display device 124 may also be configured to provide haptic output, such as in response to touch input. Accordingly, in such an implementation, the display device 124 represents an instance of a touch input device 118, a visual output device 120, and a haptic output device 122. Alternatively, the client device 102 can be configured to enable haptic output via the display device 124 without the display device 124 itself being configured for haptic output. For instance, a different haptic output device 122 can be positioned relative to the display device 124 to enable haptic output on the surface of the display device 124.

The keyboard 126 is representative of functionality for receiving input via a selection of keys. Generally, the keys of the keyboard 126 represent different characters such that selection of a particular key enables input of a respective character to the client device 102. The keys may be implemented in various ways, including by way of example and not limitation, mechanical-switch keyboards, membrane-based keyboards, dome-switch keyboards, scissor-switch keyboards, and so forth.

The touchpad 128 is representative of functionality for receiving touch input to the client device 102, such as for navigating a cursor or other visual indicator across the display device 124, and for interacting with visual elements displayed on the display device 124. The touchpad 128, for instance, represents an instance of the touch input devices 118. In at least one implementation, the touchpad 128 can not only receive touch input for the client device 102, but can provide various types of haptic output. Thus, in such an implementation, the touchpad 128 represents an instance of a touch input device 118 and a haptic output device 122. In at least one implementation, the touchpad 128 and the keyboard 126 are integrated into a single common physical structure.

As further described below, the touchpad 128 can be divided into different touch regions that each have a different respective functionality. Further, how the touchpad 128 is divided can depend on a particular context, such as a particular application 106 that is in focus, or a posture of the client device 102.

Continuing with the discussion of the client device 102, the sensors 110 represent functionality for sensing various device-related and environmental phenomena, and generating data that characterizes the phenomena. A wide variety of different types and arrangements of sensors 110 can be implemented for detecting a variety of different phenomena that can be used as context information according to techniques described herein. Non-limiting examples of the sensors 110 include position sensors (e.g., geographical position sensors, relative position sensors, proximity sensors, and so on), identity sensors, light sensors, sound sensors, temperature sensors, and so forth.

The I/O module 112 represents functionality processing and directing input and output relating to the I/O devices 108. The I/O module 112, for instance, can detect input to the touch input devices 118, and can enable the input to be processed and directed to an appropriate functionality, such as the applications 106, the operating system 104, and/or the touch input module 116. Further, the I/O module 112 can enable output via the I/O devices 108, such as visual output from the visual output devices 120 and haptic output from the haptic output devices 122.

The graphics module 114 represents functionality to enable graphics to be displayed via the client device 102, such as on the display device 124 and/or a remote display device. Example implementations of the graphics module 114 include a graphics driver, a display driver, a graphics processing unit (GPU), a rendering engine, and/or combinations thereof.

Further to the described implementations, the touch input module 116 represents functionality for performing various aspects of techniques for layout for a touch input surface described herein. The touch input module 116, for instance, can cause different touch input devices 118 to be configured and reconfigured in different ways and based on different contexts and changes in context. The touch input module 116 includes context mappings 130, device layouts 132, gesture mappings 134, haptic profiles 136, and a touch input application programming interface (API) 138.

The context mappings 130 represent data that maps different context information to different touch input device 118 configurations, such as for configuring a layout of the touchpad 128, the display device 124 (in a touchscreen implementation), and/or an external touch input device. The context mappings 130, for instance, map different contexts to different device layouts 132. Context can include a variety of different types of information, such as device state information and/or environmental information. Examples of different types of context information are discussed below. In at least some implementations, the context mappings 130 may also affect configuration and/or functionality of the visual output devices 120 and the haptic output devices 122.

The device layouts 132 represent data that defines different configurations for touch input surfaces, such as for the touchpad 128 and/or the display device 124. The device layouts 132, for instance, include zone configurations 140 and functionality sets 142. The zone configurations 140 represent data that specifies how a particular touch input surface is to be segregated into different touch input zones. Further, the functionality sets 142 represent data that specifies, for each zone configuration 140, functionality associated with individual input zones. The functionality sets 142, for instance, specify different individual zone functionalities 144 to be applied to particular input zones defined by the zone configurations 140. Further aspects of the device layouts 132 are detailed below.

The gesture mappings 134 represent data that maps different gestures to different functionalities and based on particular device layouts 132. For instance, a particular gesture to a touch input device 118 can invoke different functionality dependent on which zone configuration 140 is applied to the touch input device 118, and which input zone receives the gesture. As described herein, a "gesture" includes any particular type of touch input to an input surface, such as to the touchpad 128 and/or the display device 124.

The haptic profiles 136 represent data that maps different haptic effects to different zone configurations 140. For instance, when a touch input device 118 is divided according to a particular zone configuration 140 into multiple zones, a particular haptic profile 136 can specify particular haptic effects that are to be output by the touch input device 118 at each of the zones. In at least some implementations, each of the zones can be associated with a different haptic effect and/or combination of haptic effects.

The touch input API 138 represents functionality to enable other functionalities to interact with the touch input module 116 and/or the touch input devices 118. For instance, the operating system 104 and the applications 106 can call the touch input API 138 to request that the touch input module 116 apply a particular zone configuration 140 and/or functionality set 142 to a particular touch input device 118.

In at least some implementations, the touch input module 116 may be implemented as part of system resources of the client device 102, such as part of the operating system 104. Alternatively or additionally, the touch input module 116 can be implemented as part of the touch input devices 118, such as in firmware of a particular touch input device 118.

While certain implementations are discussed herein from the perspective of touch input devices 118 that are integrated into the client device 102, it is to be appreciated that techniques described herein can alternatively or additionally be applied using external (e.g., peripheral) touch input devices. For examples, an instance of a touch input device 118 can be implemented as a separate, external device that is connectable to the client device 102 via a wired and/or wireless connection, such as a peripheral touchpad or display device. In a scenario that utilizes an external touch input device 118, the touch input module 116 may reside on the client device 102, and/or may represent onboard functionality that is implemented on the external touch input device 120.

The client device 102 further includes touch input data 146, which represents information about whether a particular application 106 specifies a custom touch input device 118 configuration that deviates from default touch input device configurations, e.g., from the context mappings 130 and/or the gesture mappings 134. In such a scenario, the touch input module 116 can apply, for the particular application 106, the custom touch input device 118 configuration instead of the default touch input device 118 configuration. Generally, the touch input data 146 may be implemented as part of the touch input module 116, as part of the operating system 104, and/or as a standalone set of touch input data that is accessible by different functionalities of the client device 102.

Further illustrated as part of the environment 100 is a pen 148, which is representative of an input device that can provide input to the client device 102. The pen 148, for instance, can be leveraged to provide touch input to the touch input devices 118, such as to apply digital ink to the display device 124. The pen 148 can also be used for other purposes, such as selection and manipulation of visual objects displayed on the display device 124.

According to various implementations, haptic effects can be generated based on interaction between the pen 148 and the client device 102. For instance, when the pen 148 is used to provide input to the display device 124, a haptic effect can be generated based on a context of the input. The haptic effect, for example, can be generated by a haptic output device 122. Alternatively or additionally, the pen 148 is haptic-enabled such that the pen 148 can generate haptic effects. For instance, in a haptic-enabled implementation, the pen 148 includes various internal components that can generate haptic effects in response to interaction between the pen 148 and the client device 102. The pen 148, for example, can provide input to the display device 124, and based on a context of the input can generate a haptic response. The various implementations and scenarios discussed below, for example, may apply to haptic effects generated by various haptic-enabled devices, such as the touchpad 128, the display device 124, and/or the pen 148.

Having described an example environment in which the techniques described herein may operate, consider now a discussion of an example implementation scenario for layout for a touch input surface in accordance with one or more embodiments.

Example Implementation Scenarios

The following section describes some example implementation scenarios for layout for a touch input surface in accordance with one or more implementations. The implementation scenarios may be implemented in the environment 100 discussed above, and/or any other suitable environment.

Figure 2:
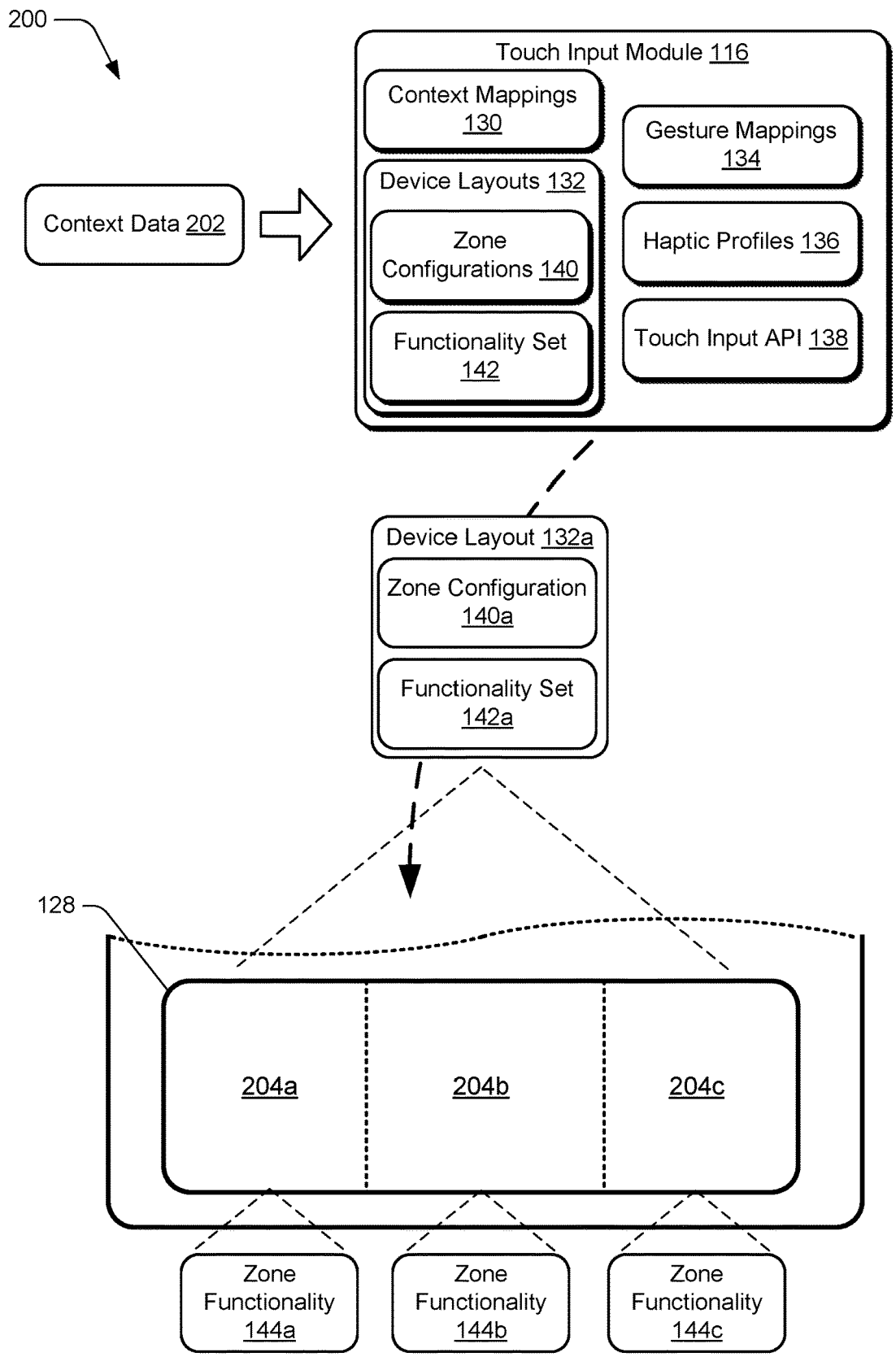
FIG. 2 illustrates an example implementation scenario for configuring a layout of a touch input device.

FIG. 2 depicts an example implementation scenario 200 for configuring a layout of a touch input device. In the scenario 200, the touch input module 116 receives context data 202, such as from the operating system 104. Non-limiting examples of context data include:

Application context—which application 106 is currently active and/or in focus on the client device 102. In at least some implementations, individual applications 106 can specify different layouts for a touch input device 118. Additionally or alternatively, application context can include applications that have multiple operating modes that can change dynamically (e.g., during application runtime), such as based on a change in context.

Operating system context—whether the operating system 104 or other system functionality is in focus or is generating an event that requires attention. Additionally or alternatively, OS context can include a particular mode and/or state of an OS. For instance, OS context can include an indication that an OS is in a transient mode during a particular operation, such as a drag and drop operation. Further, different system menus can represent OS context that can be leveraged as context data as described herein.

User identity—an identity of a user that is authenticated with and/or is interacting with the client device 102. In at least some implementations, a particular user can be associated with a custom input device layout, such as defined by the user as a user preference. Alternatively or additionally, a particular user may have a physical impairment such that a custom touch input device layout can be specified for the user to increase the accessibility of the client device 102 for the user.

External devices—identities and/or attributes of external devices (e.g., peripherals) that are connected to the client device 102, such as via a wired and/or wireless connection. Some external devices, for instance, can be associated with particular operating scenarios that affect how a touch input device 118 is configured.

Device posture—a posture of the client device, e.g., an angle of the keyboard 126 relative to the display device 124, an angle of the client device 102 relative to a gravitational vector, whether the display device 124 is in a portrait or landscape orientation, and so forth.

Content type—a type of content displayed on the display device 124. In at least some implementations, a particular type of content may be associated with a known type of user interaction such that a touch input device can be configured to be optimized for the interaction type.

Environmental context—different factors from an environment that surrounds the client device 102 can be used as context information. For instance, sensor data from one or more sensors 110 represent context information. Examples of sensor data include device location, device position, light level, sound, user identity, temperature, motion, and so forth.

These examples of context are presented for purpose of example only, and it is to be appreciated that a wide variety of different types and instances of context information can be leveraged according to techniques for layout for a touch input surface described herein.

Continuing with the scenario 200, the touch input module 116 applies the context data 202 to the context mappings 130 to determine a device layout 132*a* for the touchpad 128. The context mappings 130, for instance, match different instances of context data to different device layouts 132. The device layout 132*a* includes a zone configuration 140*a* and a functionality set 142*a*. Accordingly, the touchpad 128*a* is logically divided into a zone 204*a*, a zone 204*b*, and a zone 204*c*. Generally, the zones 204*a*-204*c* represent different logical divisions of the touchpad 128 into different regions such that input to the touchpad 128 is characterized according to the particular zone in which the input is received.

Each of the zones 204*a*-204*c* has a different respective functionality defined by the functionality set 142. For instance, the zone 204*a* has a zone functionality 144*a*, the zone 204*b* has a zone functionality 144*b*, and the zone 204*c* has a zone functionality 144*c*. In at least some implementations, the zone functionalities 144*a*-144*c* each represent different respective functionalities such that a same type of input applied to each of the zones 204*a*-204*c* invokes a different respective functionality.

The scenario 200, along with others of the scenarios herein, depict the touch input zones as being visually distinguishable from one another. Generally, this is for ease of understanding and for purposes of illustration, and it is to be appreciated that in at least some implementations different touch input zones may not be visibly distinct from one another. For instance, the touchpad 128 (and/or other touch input device 118) can be implemented as a visibly uniform touch surface that can be logically divided into different touch input zones that are not visibly distinct from one another. This is not to be construed as limiting, however, and in some implementations touch input zones can be visibly differentiated, such as using different surface textures, colors, orientations, and so forth. Additionally or alternatively, and as described below, haptic effects can be employed to differentiate touch input zones from one another.

The scenario 200 can be applied iteratively and in real time to enable reconfiguration of the touchpad 128 in response to a change in the context data 202. For instance, consider that after the touchpad 128 is configured according to the device layout 132*a*, the touch input module 116 receives different context data. Accordingly, the touch input module 116 applies the different context data to the context mappings 130 to determine a different device layout 132 for the touchpad 128. The touch input module 116 then reconfigures the touchpad 128 from the device layout 132*a* to the different device layout 132. Consider, for example, the following scenario.

Figure 3:
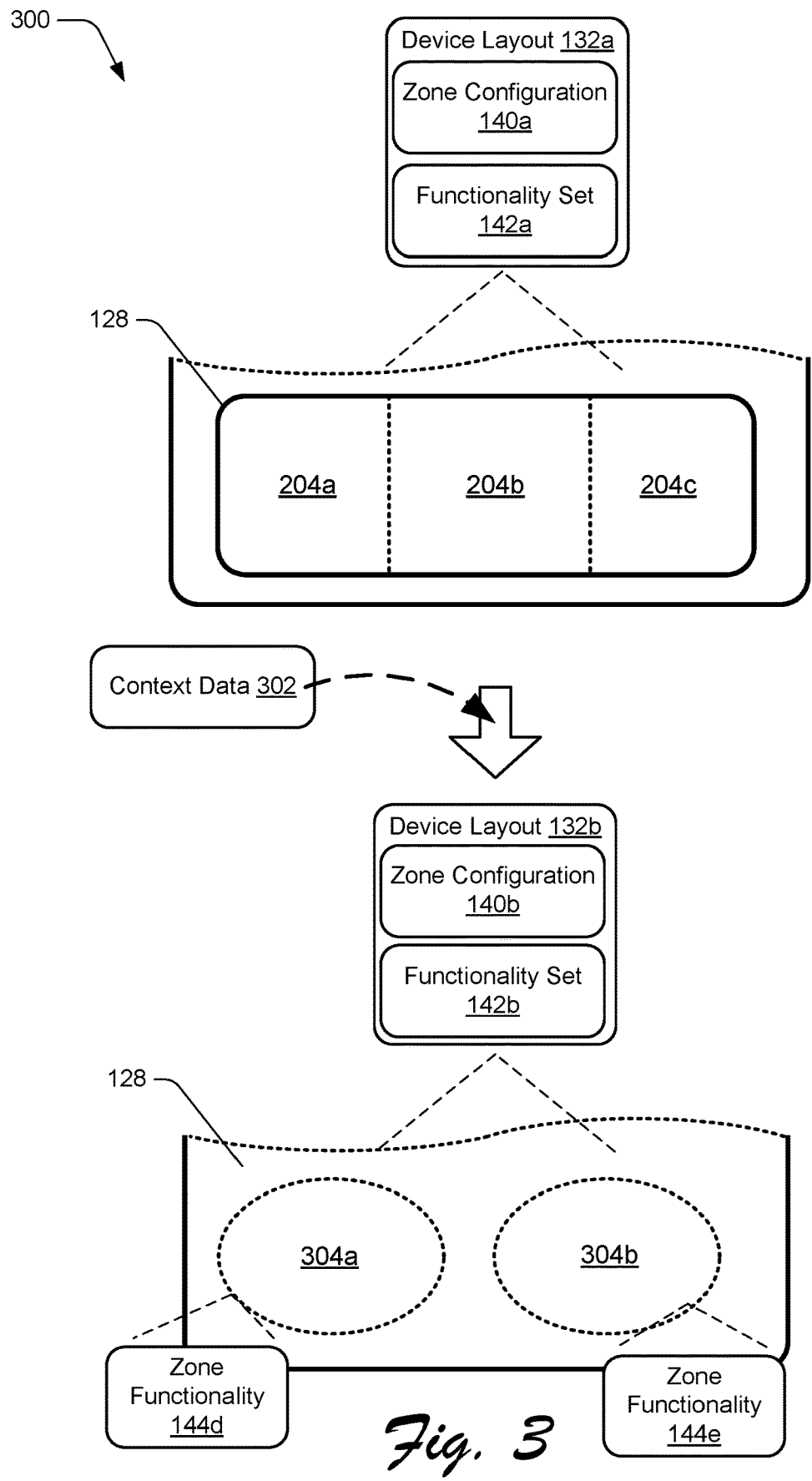
FIG. 3 depicts an example implementation scenario for reconfiguring a layout of a touch input device.

FIG. 3 depicts a scenario 300 for reconfiguring a layout of a touch input device. The scenario 300, for instance, represents a continuation of the scenario 200, discussed above. In the upper portion of the scenario 300, the touchpad 128 is configured according to the device layout 132a, such as described above. Proceeding to the lower portion of the scenario 300, context data 302 is received and used by the touch input module 116 to determine a device layout 132b to be applied to the touchpad 128. The context data 302, for instance, represents a change in context from the context data 202. Examples of different types of context information are described above. In a process similar to that described in the scenario 200, the touch input module 116 applies the context data 202 to the context mappings 130 to identify the device layout 132b.

The device layout 132b includes a zone configuration 140b and functionality set 142b. Accordingly, the touchpad 128 is reconfigured from the device layout 132a to the device layout 132b such that the touchpad 128 is divided into a zone 304a and a zone 304b. Notice that the zones 304a, 304b are shaped different than the zones 204a-204c. Thus, a touch input device can be divided into any suitable number, shape, and arrangement of input zones.

Further to the scenario 300, the zone 304a is associated with a zone functionality 144d and the zone 304b is associated with a zone functionality 144e. Generally, the zone functionalities 144d, 144e represent different respective functionalities that can be invoked in response to input to the respective zones 304a, 304b.

Accordingly, the scenario 300 demonstrates that techniques for layout for a touch input surface can be employed to reconfigure a layout of a touch input device dynamically and in response to a change in context. In at least one implementation, the scenario 300 can be implemented to change touch input device layout while the client device 102 is active and running. The scenario 300 may also be implemented when the client device 102 is powered off and then powered back on, such as in response to a change in context that occurs when the client device 102 is powered back on from an off state.

Figure 4:
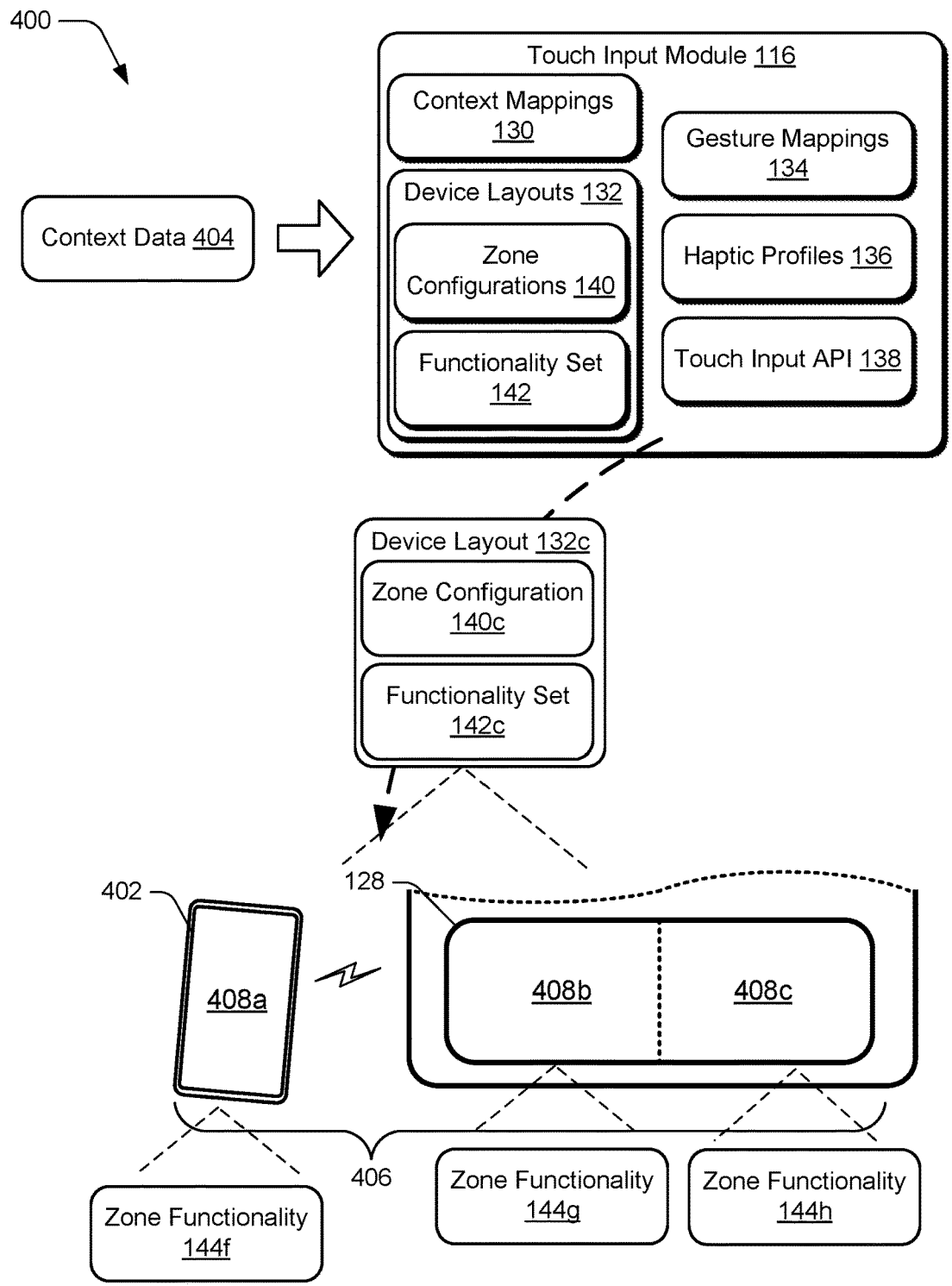
FIG. 4 depicts an example implementation scenario for configuring layout of a touch input surface that includes multiple devices.

FIG. 4 depicts a scenario 400 for configuring layout of a touch input surface that includes multiple devices. The scenario 400 includes the touchpad 128 and an external device 402. The external device 402, for instance, represents a device that is connected to the client device 102 via a wired and/or wireless connection. The external device 402 can be implemented in various ways, such as a peripheral device (e.g., a peripheral touchpad or other touch input surface), a smartphone, a tablet, and so forth.

In the scenario 400, the touch input module 116 receives context data 404, which indicates that the external device 402 is connected to the client device 102 and that the external device 402 includes touch input capability. In at least one implementation, the context data 404 includes an identifier for the external device 402, such as an identifier that identifies a device type of the external device 402. The context data 404 may include other types of information, such as a screen size of the external device 402, processing capabilities of the external device, communication protocols (wireless and/or wired) supported by the external device 402, and so forth. In one or more implementations, the context data 404 is generated in response to connection of the external device 402 to the client device 102.

Accordingly, the touch input module 116 applies the context data 404 to the context mappings 130 to generate a device layout 132c. The device layout 132c is configured to enable a touch input surface 406 to be generated that includes the touchpad 128 and the external device 402. The device layout 132c, for instance, includes a zone configuration 140c that specifies a zone 408a that corresponds to the external device 402, and zones 408b and 408c that are formed by dividing the touchpad 128 into two different zones. Generally, touch input to each of the zones 408a-408c invokes a different functionality. For instance, the zone 408a is associated with a zone functionality 144f, the zone 408b is associated with a zone functionality 144g, and the zone 408c is associated with a zone functionality 144h. Accordingly, the touch input surface 406 represents a single logical touch input device 118 that is created using separate physical devices, i.e., the external device 402 and the touchpad 128.

Figure 5:
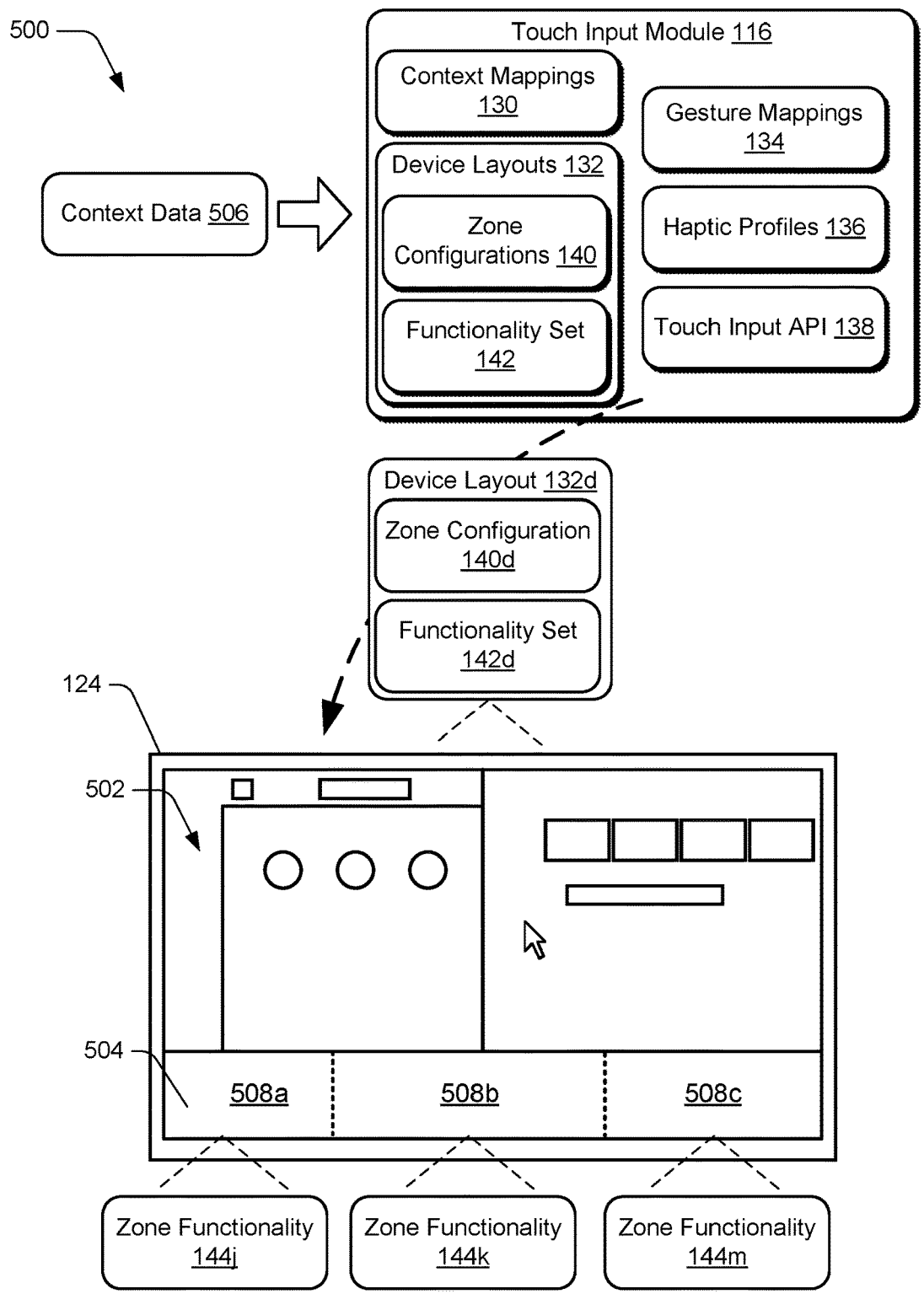
FIG. 5 depicts an implementation scenario for configuring a layout of a touch input device in a touchscreen implementation.

FIG. 5 depicts an implementation scenario 500 for configuring a layout of a touch input device in a touchscreen implementation. The scenario 500 includes a visual environment 502 displayed on the display device 124. The visual environment 502 generally includes different visual elements, such as graphical user interfaces (GUIs), system controls, visual content, and so forth. In this example, the visual environment 502 includes a touch region 504, which generally represents a region of the display device 124 that is designated for receiving touch input to invoke different functionalities. The touch region 504, for instance, represents a single logical sub-region of the display device 124 that can be configured in different ways, such as based on different contexts.

Further to the scenario 500, the touch input module 116 receives context data 506 and generates a device layout 132d for configuring the touch region 504. Examples of different types and instances of context data are described above. The device layout 132d includes a zone configuration 140d which is used to divide the touch region 504 into a zone 508a, a zone 508b, and a zone 508c. The device layout 132d also includes functionality set 142d, which includes a zone functionality 144j for the zone 508a, a zone functionality 144k for the zone 508b, and a zone functionality 144m for the zone 508c. Accordingly, a user can interact with each of the zones 508a-508c to invoke a different respective zone functionality.

Figure 6A:
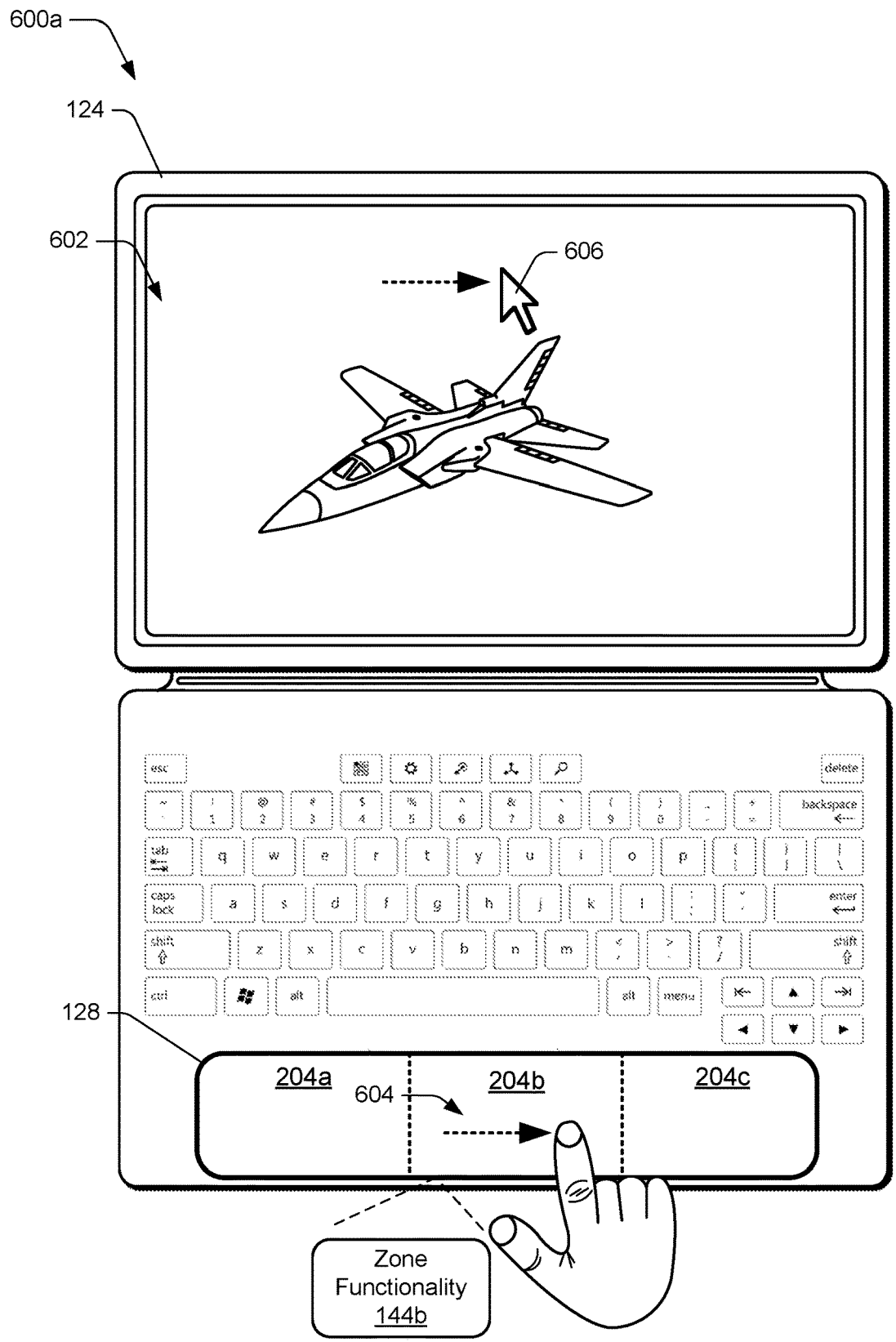
FIG. 6a depicts an implementation scenario for interaction via a dynamic touch input device.

FIG. 6a depicts an implementation scenario 600a for interaction via a dynamic touch input device. In the scenario 600a, the touchpad 128 is configured as discussed in the scenario 200. Further, a visual environment 602 is displayed on the display device 124. A user applies a touch input gesture 604 to the zone 204b of the touchpad 128, which causes the zone functionality 144b to be invoked. The gesture 604, for instance, is a slide gesture within the zone 204b. In this particular example, the zone functionality 144b corresponds to moving a cursor 606 within the visual environment 602. Thus, user input to the zone 204b of the touchpad 128 causes a corresponding movement of the cursor 606.

Figure 6B:
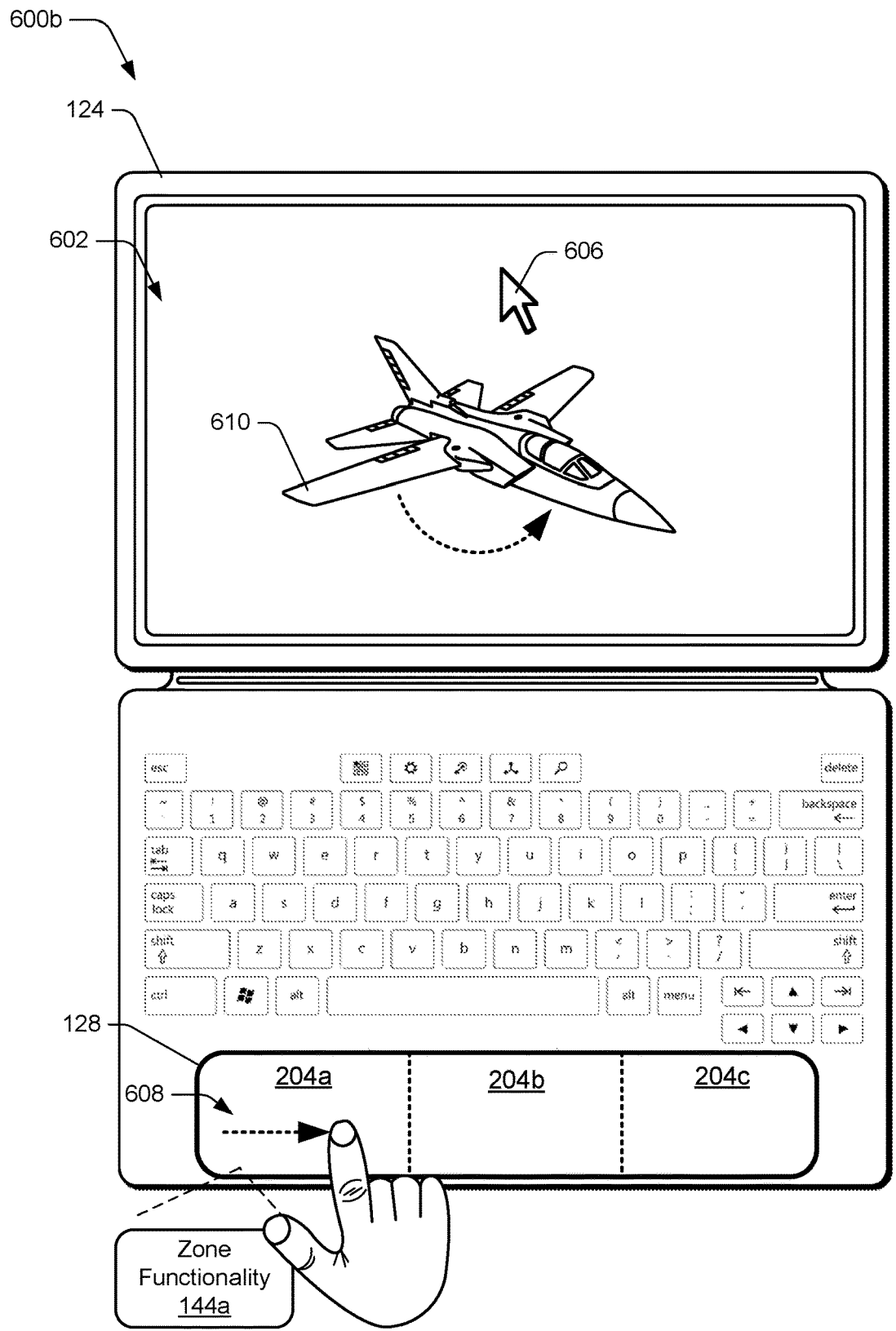
FIG. 6b depicts an implementation scenario for interaction via a dynamic touch input device.

FIG. 6b depicts an implementation scenario 600b for interaction via a dynamic touch input device. The scenario 600b, for instance, represents a continuation of the scenario 600a. In the scenario 600b, the user provides a touch input gesture 608 to the zone 204a of the touchpad 128, which invokes the zone functionality 144a. In this particular example, the zone functionality 144a causes a rotation of a visual element 610 displayed in the visual environment 602. For instance, instead of moving the cursor 606, input to the zone 204a causes a corresponding rotation of the visual element 610 and/or other visual attributes of the visual environment 602.

Notice that the gesture 608 is the same as the gesture 604 (e.g., a slide gesture), but is applied to a different input zone of the touchpad 128 and thus invokes a different functionality.

Figure 6C:
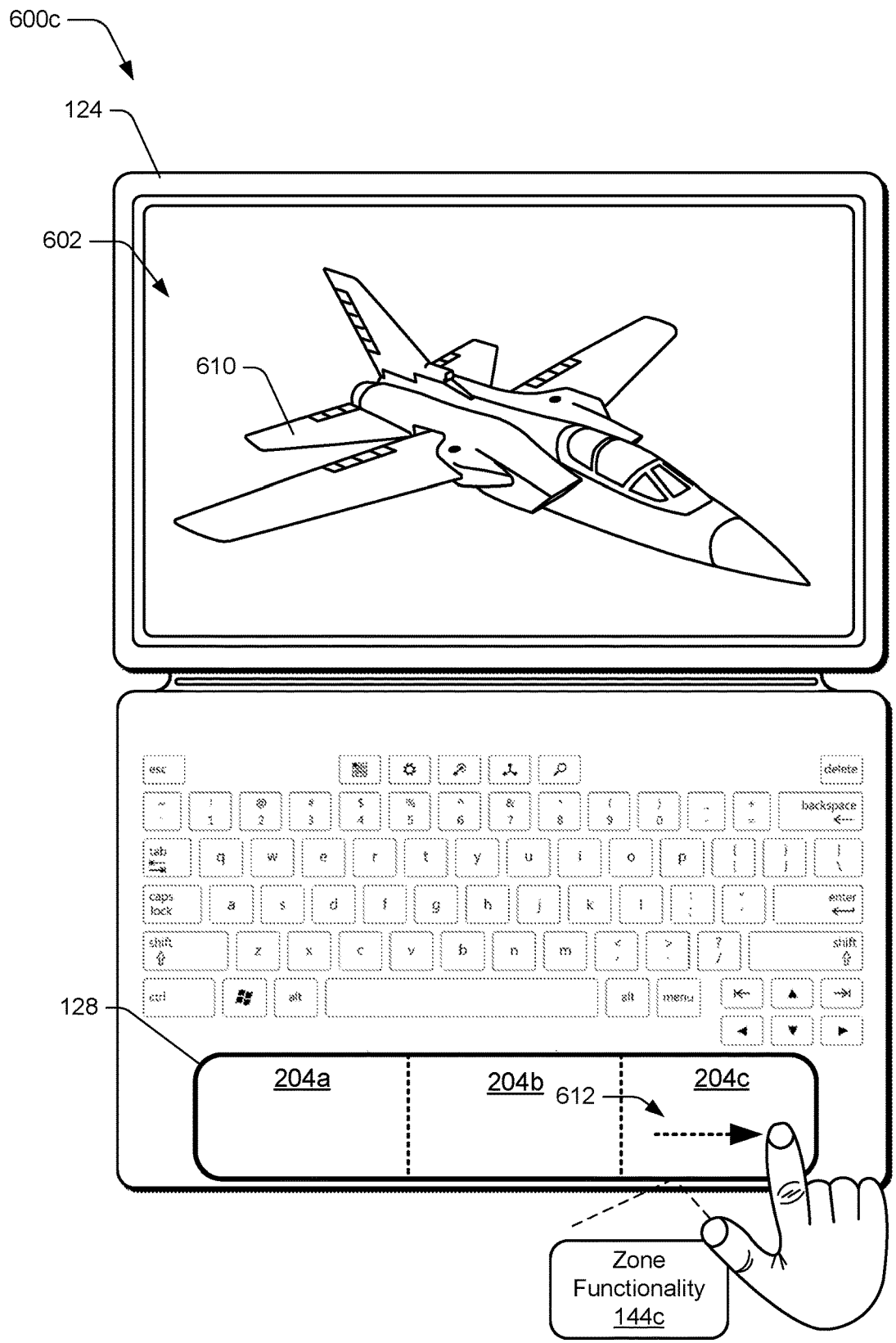
FIG. 6c depicts an implementation scenario for interaction via a dynamic touch input device

FIG. 6c depicts an implementation scenario 600c for interaction via a dynamic touch input device. The scenario 600c, for instance, represents a continuation of the scenarios 600a, 600b discussed above. In the scenario 600c, the user applies a touch input gesture 612 to the zone 204c of the touchpad 128, which invokes the zone functionality 144c. The zone functionality 144c causes a visual zoom operation to occur in the visual environment 602. For instance, invoking the zone functionality 144c via the gesture 612 causes a zoom-in operation on the visual environment 602 and/or visual elements of the visual environment 602, such as the visual element 610.

Notice that the gesture 612 is the same as the gestures 604, 608 (e.g., a slide gesture), but is applied to a different input zone of the touchpad 128 and thus invokes a different functionality. Accordingly, the scenarios 600a-600c illustrate that a touch input surface can be divided into different logical zones that can enable different respective functionalities to be invoked.

Figure 7:
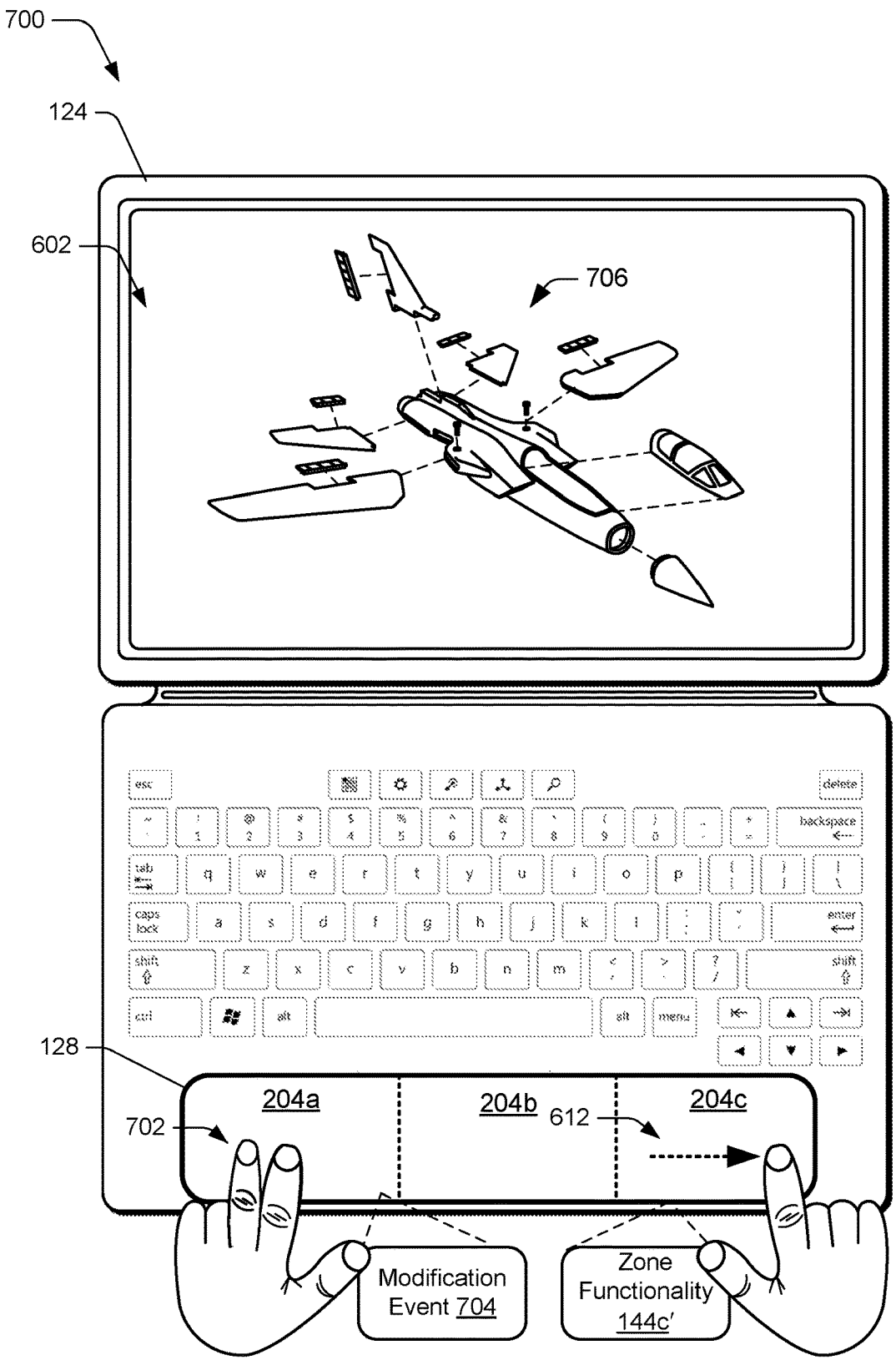
FIG. 7 depicts an implementation scenario for touch input modification.

FIG. 7 depicts a scenario 700 for touch input modification. The scenario 700, for instance, represents a continuation of the scenarios 600a-600c discussed above. In the scenario 700, the user applies a touch input gesture 702 to the zone 204a. In this example, the gesture 702 is a press and hold gesture in the zone 204a using two fingers. Further, the user applies the touch input gesture 612 to the zone 204c of the touchpad 128. Accordingly, the gesture 702 invokes a gesture modification event 704 that modifies the zone functionality 144c to a zone functionality 144c'. Accordingly, the gesture 612 invokes the zone functionality 144c' instead of the zone functionality 144c. In this particular example, the zone functionality 144c' causes a visual modification of the visual element 610. Invoking the zone functionality 144c', for instance, causes an exploded view 706 of the visual element 610 to be displayed.

Accordingly, the scenario 700 demonstrates that functionality invoked by a particular gesture in a particular zone can be modified using any suitable type of gesture modifier, such as a gesture in a different zone.

Figure 8:
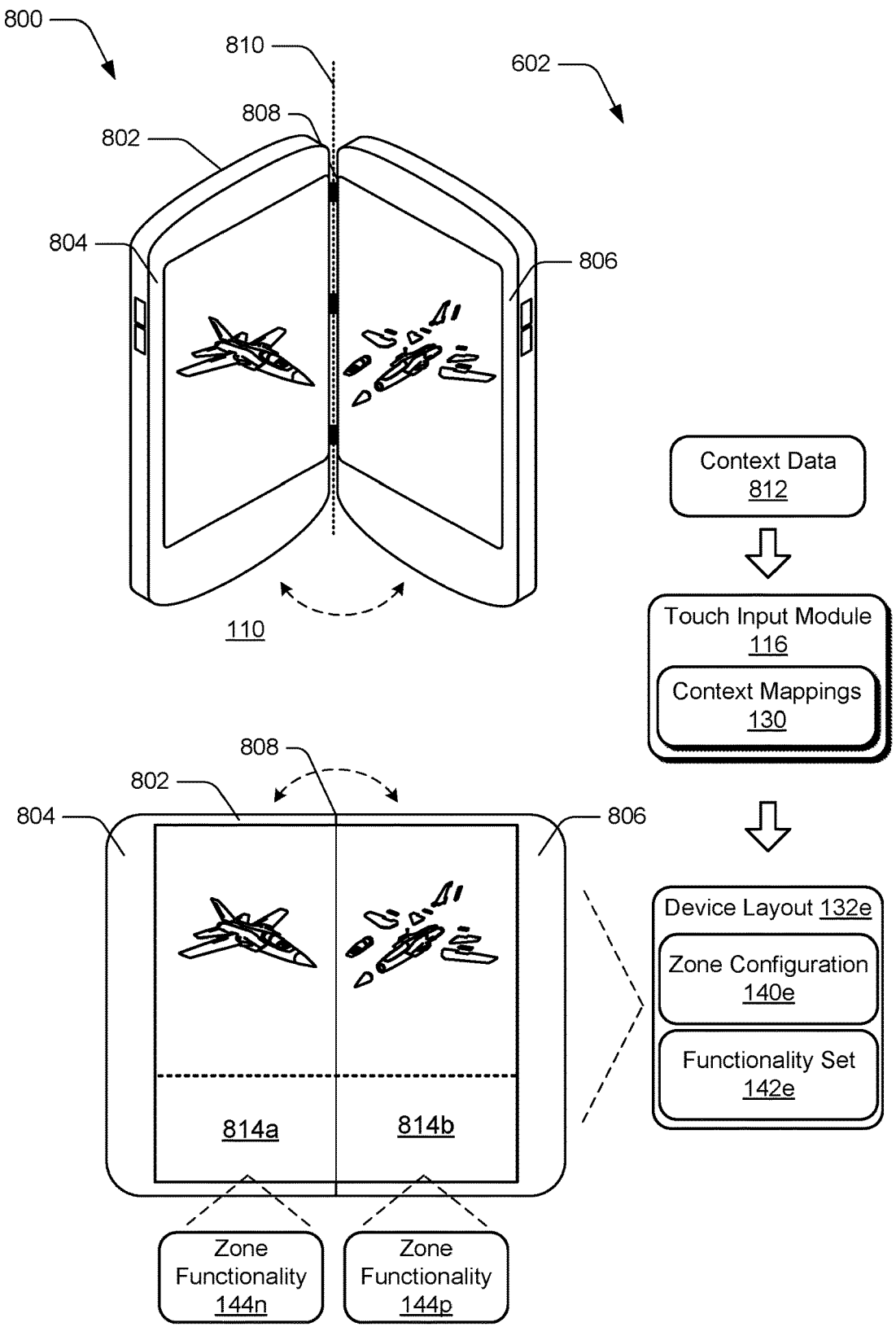
FIG. 8 depicts an implementation scenario for configuring a touch input region of a multi-screen device.

FIG. 8 depicts an implementation scenario 800 for configuring a touch input region of a multi-screen device. The scenario 800 includes a multi-screen device 802, which represents an instance of the client device 102 described above. The multi-screen device 802 generally includes the various functionalities described above in reference to the client device 102.

The multi-screen device 802 includes a display device 804 and a display device 806 that are connected to one another by a hinge 808. According to various implementations, the display devices 804, 806 generally represent functionality for visual output for the client device 102. Additionally, the display devices 104, 106 represent functionality for receiving various types of input, such as touch input, stylus input, touchless proximity input, and so forth.

Generally, the hinge 808 is configured to rotationally move about a longitudinal hinge axis 810 of the hinge 808 to allow an angle between the display devices 804, 806 to change. In this way, the hinge 808 allows the display devices 804, 806 to be connected to one another yet be oriented at different angles and/or planar orientations relative to each other. In at least some implementations, the display devices 804, 806 may represent different portions of a single integrated and continuous display surface that can be bent along the hinge 808. Thus, the hinge 808 may represent a separate component that hingeably attaches the display devices 804, 806, or the hinge 808 may represent a portion of a single integrated display surface that includes the display devices 804, 806 and about which the display devices 804, 806 can bend.

According to techniques for layout for a touch input surface described herein, one or both of the display devices 804, 806 can be configured as touch input devices with different touch input zones. Based on different context data, for example, the display device 804 and/or the display device 806 can be configured as a touch input device 118.

For instance, proceeding to the lower portion of the scenario 800, consider that a user opens the multi-screen device 802 by pivoting the display devices 804, 806 about the hinge 808. The user, for instance, opens the multi-screen device 802 such that the display devices 804, 806 form a flat or approximately flat surface. This change in device posture for the multi-screen device 802 generates context data 812, which the touch input module 116 utilizes to generate a device layout 132e for the multi-screen device 802. The device layout 132e includes a zone configuration 140e and functionality set 142e for the device layout 132e.

Based on the zone configuration 140e, the display devices 804, 806 are logically divided into a zone 814a and a zone 814b, respectively. For instance, a bottom portion of the display device 804 is designated as the zone 814a, and a bottom portion of the display device 806 is designated as the zone 814b.

Further, the zone 814a is associated with a zone functionality 144n, and the zone 814b is associated with a zone functionality 144p. Generally, the zone functionalities 144n, 144p represent different functionalities that are invocable in response to touch input to the respective zones 814a, 814b. In at least some implementations, the zone functionalities 814a, 814b enable touch input to the zones 814a, 814b to cause different respective types of interactions with content displayed on the display devices 804, 806.

Accordingly, different types of context data can be utilized to configure and reconfigure the multi-screen device 802 for touch input. For instance, consider that the user rotates the multi-screen device 802 180 degrees from the depicted orientation. In at least some implementations, this would generate additional context data, which would cause reconfiguration of the display devices 804, 806 for touch input. For instance, the zones 814a, 814b would be moved to the opposite sides of the respective display devices 804, 806.

While the scenario 800 is discussed with reference to the context data 812 being based on a change in device posture, it is to be appreciated that a wide variety of different context information can be utilized for configuring the multi-screen device 802 for touch input. Examples of different types and instances of applicable context data are discussed above.

Figure 9:
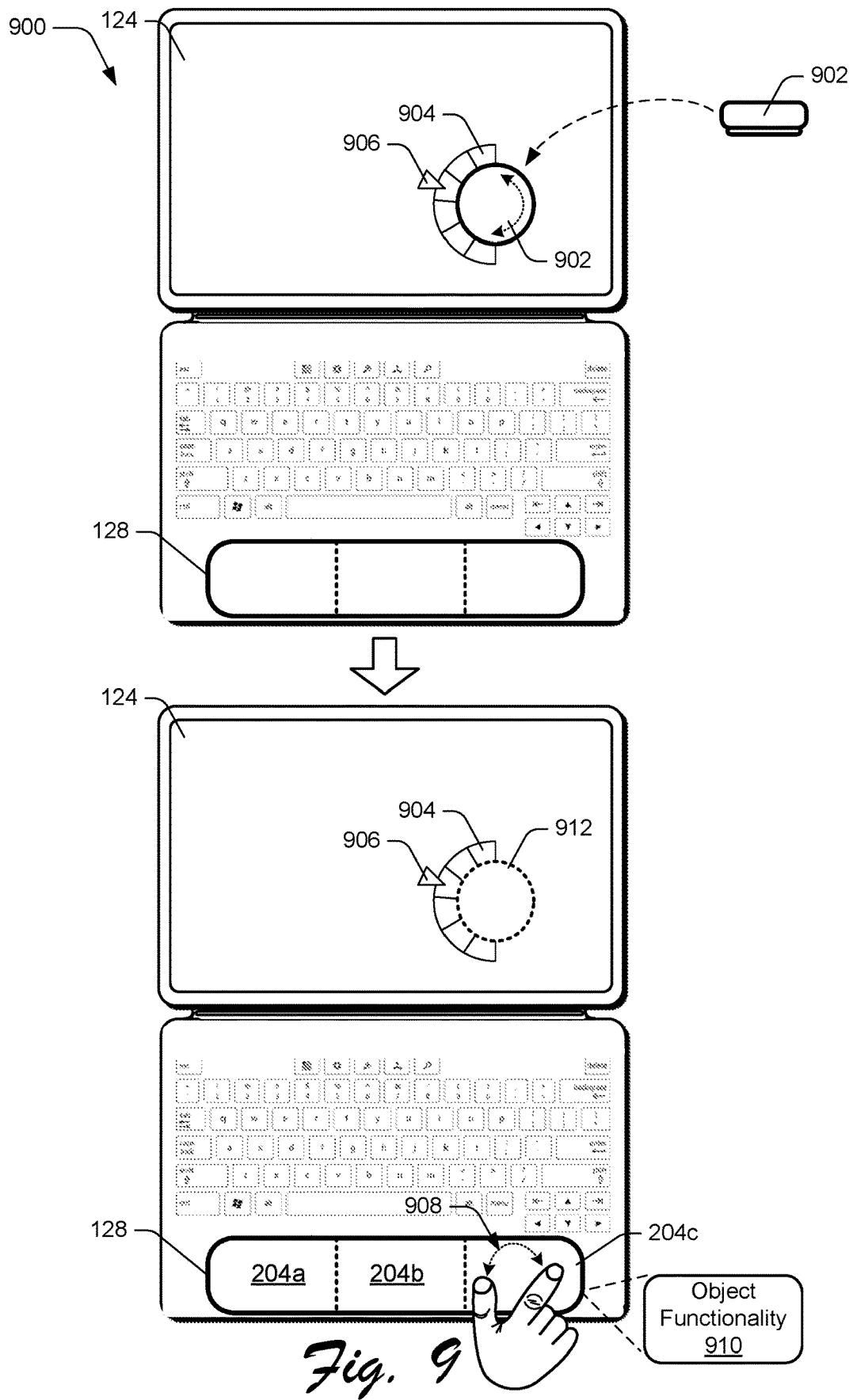
FIG. 9 depicts an implementation scenario for using gestures to simulates a physical input object.

FIG. 9 depicts an example implementation scenario 900 for using gestures to simulate a physical input object. The scenario 900 includes a radial object 902, which represents a separate, standalone physical object that can be leveraged to interact with the client device 102, and invoke functionality of the client device 102. In at least some implementations, the radial object 902 includes internal circuitry and/or other hardware that can engage in data communication with the client device 102.

Consider, for example, that a user places the radial object 902 on the display device 124. The client device 102 detects the radial object 902, and displays an interactive interface 904 adjacent the radial object 902 on the display device 124. The interactive interface 904, for instance, includes different selectable options for invoking different functionalities, such as for retrieving content, formatting text, selecting colors for graphics, and so forth. In this example, physically rotating the radial object 902 on the display device 124 causes a selection indicator 906 to index through the interactive interface 904 and to enable different functionalities represented via the interactive interface 904 to be selected and/or invoked.

According to various implementations, gestures can be used to simulate the functionality of a physical input object, such as the radial object 902. For instance, proceeding to the lower portion of the scenario 900, consider that the radial object 902 is removed from the surface of the display device 124. Further, a user provides a touch gesture 908 to the touchpad 128, such as in the zone 204c. The gesture 908, for instance, is a multi-finger gesture that simulates rotation of an object on the touchpad 128. The touch input module 116 detects the gesture 908, and invokes a virtual object functionality 910 that represents a virtual representation of the radial object 902 in contact with the display device 124.

Accordingly, invoking the object functionality 910 causes the interactive interface 904 to be presented on the display device 124, even though the radial object 902 is not present on the display device 124 and/or detectable to the client device 102. The user may then cause the selection indicator 906 to index through the interactive interface 904, such as by rotating the gesture 908 to simulate turning a physical dial. In at least one implementation, the user may select an item from the interactive interface 904, such as by providing a tap gesture on the touchpad 128, and/or a touch gesture to the display device 124.

Further to the scenario 900, invoking the object functionality 910 may include causing a visual object 912 to be displayed on the display device 124 adjacent the interactive interface 904. The visual object 912, for instance, is a 2-dimensional visual representation of the radial object 902. Accordingly, the user may visually manipulate the visual object 912 via the gesture 908 and/or other input. For instance, rotating the visual object 912 causes the selection indicator 906 to index through the interactive interface 904.

Additionally or alternatively to invoking the object functionality 910 via input to the touchpad 128, applying a particular gesture (e.g., the gesture 908) to the display device 124 may invoke the object functionality 910. Thus, a user may invoke and interact with the interactive interface 904 via touch input to the display device 124.

Accordingly, the scenario 900 demonstrates that techniques described herein can be employed to provide virtual simulation of physical input objects.

Figure 10:
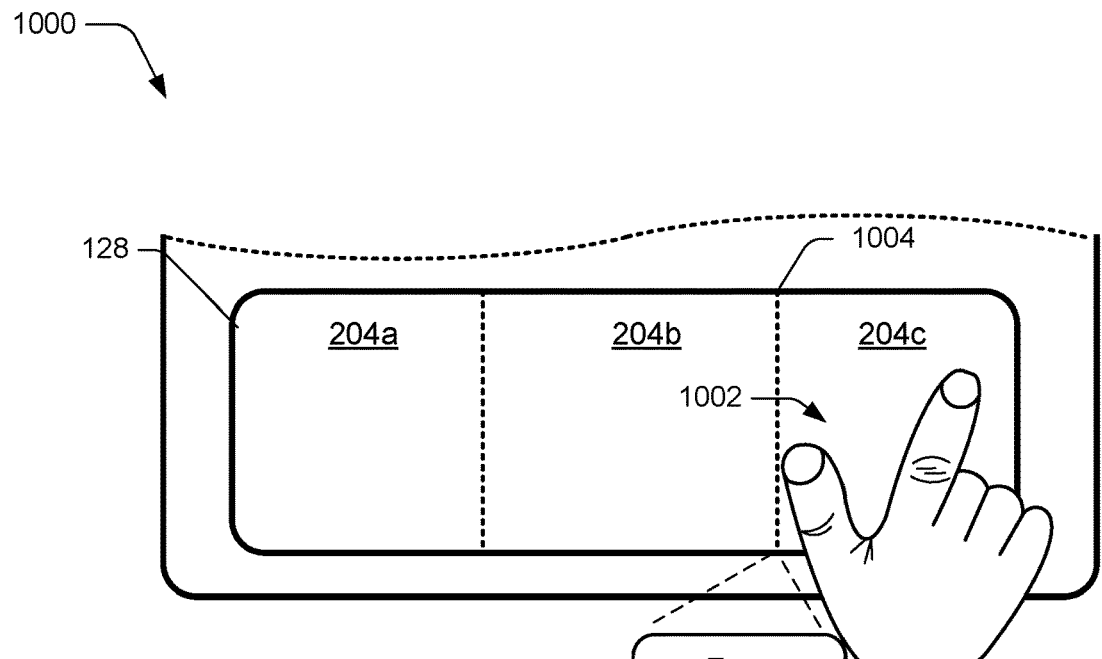
FIG. 10 depicts an implementation scenario for compensating for variations in input gestures.
Figure 10:
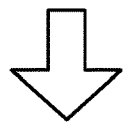
Figure 10:
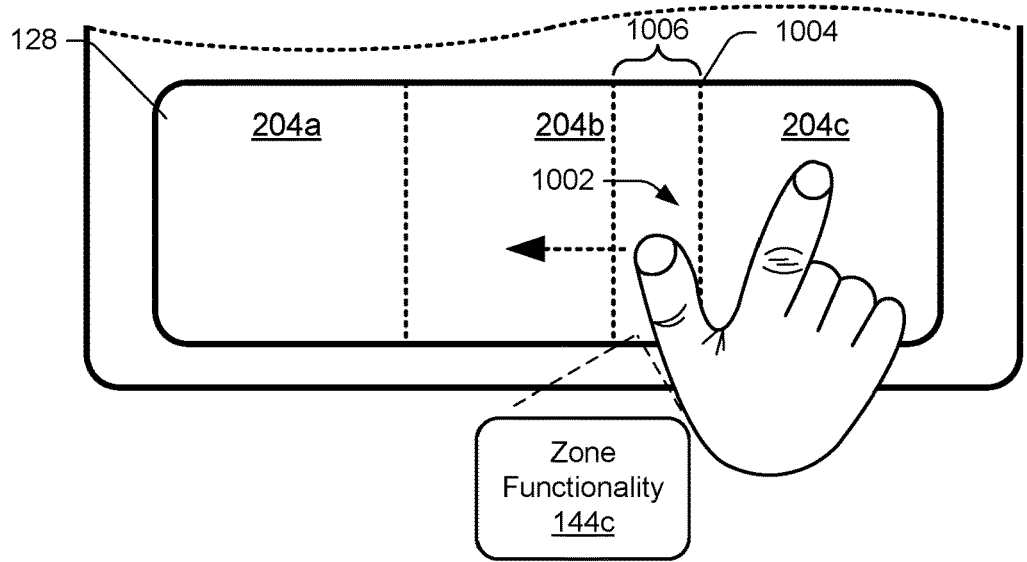

FIG. 10 depicts an example implementation scenario 1000 for compensating for variations in input gestures. The scenario 1000 includes the touchpad 128 configured as discussed in the scenario 200. In the upper portion of the scenario 1000, a user applies a gesture 1002 to the zone 204c. The gesture 1002 involves two fingers, i.e., the index finger and the thumb. One example of the gesture 1002 is an "expand" gesture, such as to zoom in on a visual item. Generally, the gesture 1002 is interpreted according to the zone functionality 144c defined for the zone 204c, and thus invokes a particular functionality.

Proceeding to the lower portion of the scenario 1000, notice that as the user continues to apply the gesture 1002, the user's thumb impinges upon the zone 204b. However, instead of interpreting the thumb touching the zone 204b as invoking the zone functionality 144b of the zone 204b, the touch input module 116 continues to interpret the gesture based on the zone functionality 144c. For instance, since the gesture 1002 originates within the zone 204c, the touch input module 116 compensates for the gesture impinging upon the zone 204b by continuing to process the gesture 1002 according to the zone functionality 204c.

In one example implementation, a logical border 1004 between the zone 204b and the zone 204c is adjusted to account for input that starts in one zone and impinges upon another. For instance, notice that the logical border 1004 is adjustable over an adjustment zone 1006 between the zones 204b, 204c. Consider, for example, that a default position of the logical border 1004 can be moved within the adjustment zone 1006 when input that begins in the zone 204c impinges upon the zone 204b.

In at least some implementations, the adjustment zone 1006 has a maximum permitted size relative to the touchpad 128. For instance, if the gesture 1002 continues to the left outside of the adjustment zone 1006, the gesture 1002 may be interpreted as being outside of the zone functionality 144c.

Further to the scenario 1000, after the user is finished applying the gesture 1002, the size of the zone 204c returns to its default position. Accordingly, the scenario 1000 demonstrates that defined input zones can be variable to adapt to input that involves multiple input zones.

Figure 11:
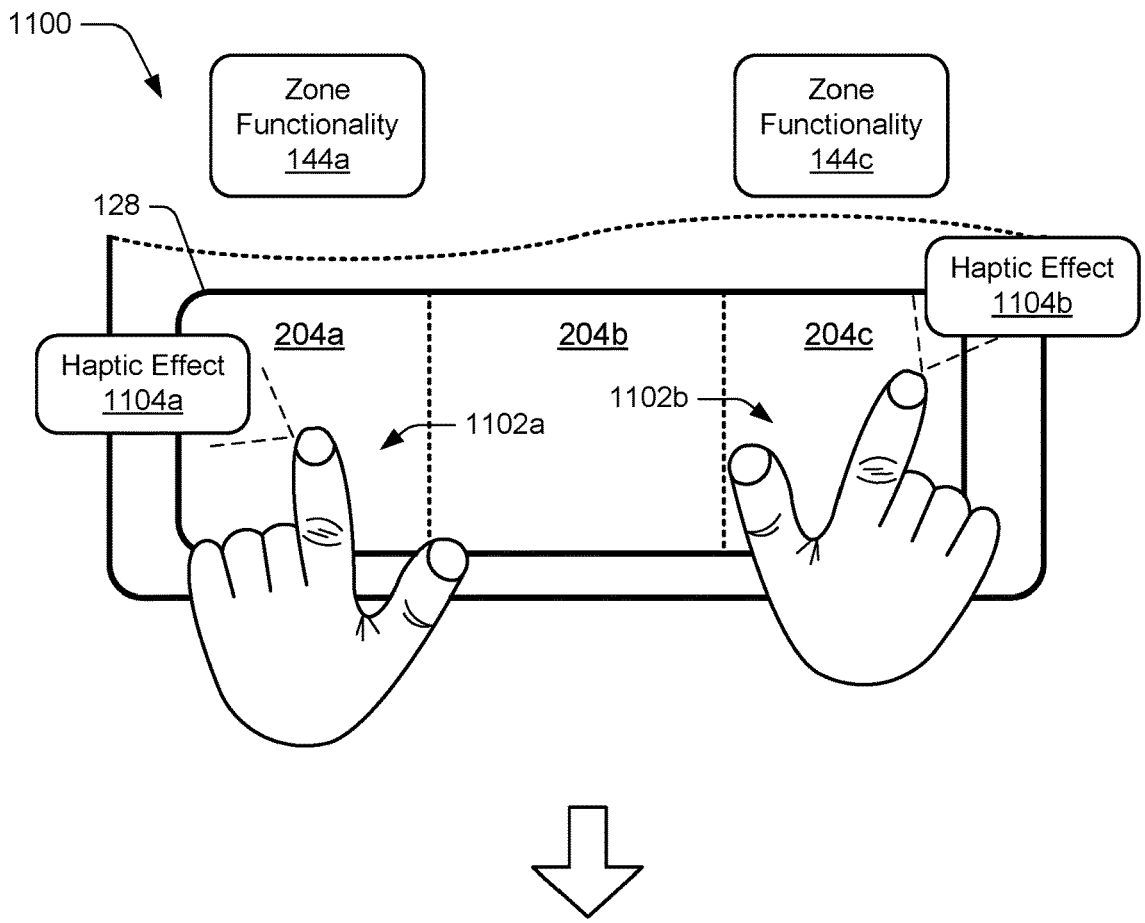
FIG. 11 depicts an implementation scenario for haptic effects for different input zones.
Figure 11:
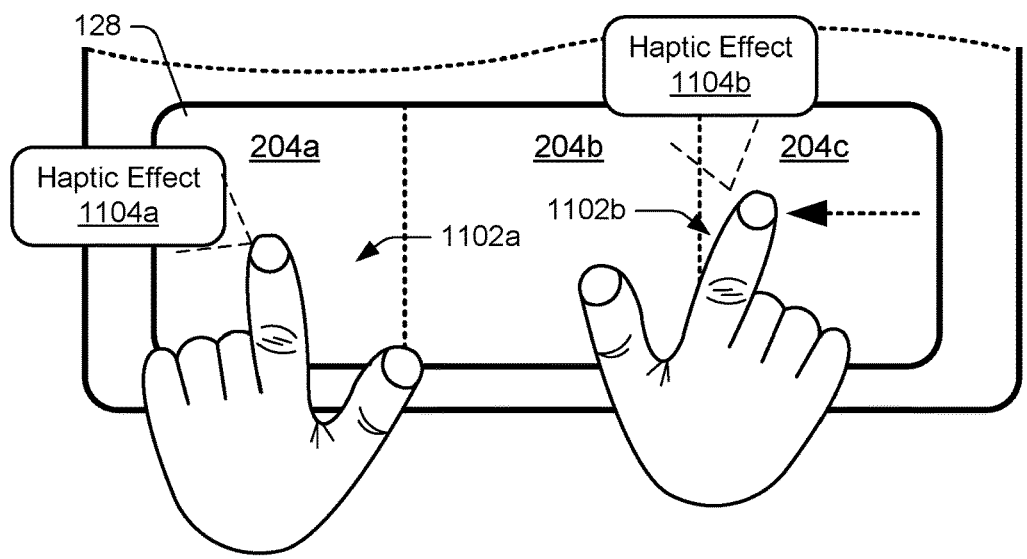

FIG. 11 depicts an example implementation scenario 1100 for haptic effects for different input zones. The scenario 1100 includes the touchpad 128 configured as discussed in the scenario 200. As mentioned above, in at least some implementations the touchpad 128 (along with other touch input devices 118) can be implemented as a touch input device 118 and a haptic output device 122.

In the scenario 1100, a user applies touch input 1102a to the zone 204a to invoke the zone functionality 144a. In addition to invoking the zone functionality 144a, the touch input 1102a causes a haptic effect 1104a to be output by the touchpad 128. In at least one implementation, the haptic effect 1104a is output locally within the zone 204a. The haptic effect 1104a, for instance, is output within the zone 204a, but not in the other zones of the touchpad 128.

Further to the scenario 1100, the user applies a different touch input 1102b to the zone 204c to invoke the zone functionality 144c. In addition to invoking the zone functionality 144c, the touch input 1102b causes a haptic effect 1104b to be output by the touchpad 128. The haptic effect 1104b, for instance, is output locally within the zone 204c. In at least some implementations, when portions of the touch input 1102a and the touch input 1102b occur concurrently, the haptic effects 1104a, 1104b can be output concurrently in the zones 204a, 204b, respectively.

Generally, the haptic effects 1104a, 1104b can be generated using one or more of a variety of different haptic-generating mechanisms, such as electrostatic force, a motor, magnets, linear resonant actuators (LRAs) (magnetic and/or piezo based), piezo-electric structures, and so forth. Further, the haptic effects 1104a, 1104b differ from one another based on one or more haptic-related attributes. Examples of different haptic-related attributes include duration, intensity, cycling frequency, waveform, effect type, and so forth, of a haptic effect. Thus, the haptic effect 1104a is configured to provide a different tactile response than the haptic effect 1104b. According to various implementations, this provides tactile reinforcement to indicate to a user which input zone the user is providing input to.

In at least some implementations, a haptic effect within an input zone can be modulated based on a proximity of a gesture to a different input zone. For instance, proceeding to the lower portion of the scenario 1100, consider that the gesture 1102b continues to the left toward the zone 204b. When the gesture 1102b reaches a threshold proximity to the zone 204b (e.g., in inches and/or millimeters), the haptic effect 1104b can be modulated to provide a tactile indication that the gesture 1102b is approaching an edge of the zone 204c and/or an edge of the zone 204b. Modulating a haptic effect, for instance, refers to changing (e.g., increasing or decreasing) one or more attributes of the haptic effect, such as frequency, intensity, attractive force (e.g., electrostatic force), and so forth. As mentioned above, the zones 204a-204b may not be visibly distinct from one another. Accordingly, haptic effects can be employed to provide a tactile reinforcement of a relative position of touch input within a particular input zone.

Accordingly, the scenarios described above illustrate that implementations for layout for a touch input surface described herein can be employed to configure and reconfigure touch input surfaces based on a variety of different contextual factors. While these scenarios are discussed with reference to particular touch input surfaces and configurations, it is to be appreciated that techniques described herein can be employed utilizing a variety of different types and combinations of touch input surfaces. For instance, while the scenarios described above are primarily discussed with reference to the touchpad 128, it is to be appreciated that the scenarios may be implemented with any touch input-enabled device.

Having discussed some example implementation scenarios, consider now a discussion of some example procedures in accordance with one or more embodiments.

Example Procedures

The following discussion describes some example procedures for layout for a touch input surface in accordance with one or more embodiments. The example procedures may be employed in the environment 100 of FIG. 1, the system 1800 of FIG. 18, and/or any other suitable environment. The procedures, for instance, represent example procedures for implementing the implementation scenarios described above. In at least some implementations, the steps described for the various procedures are implemented automatically and independent of user interaction.

Figure 12:
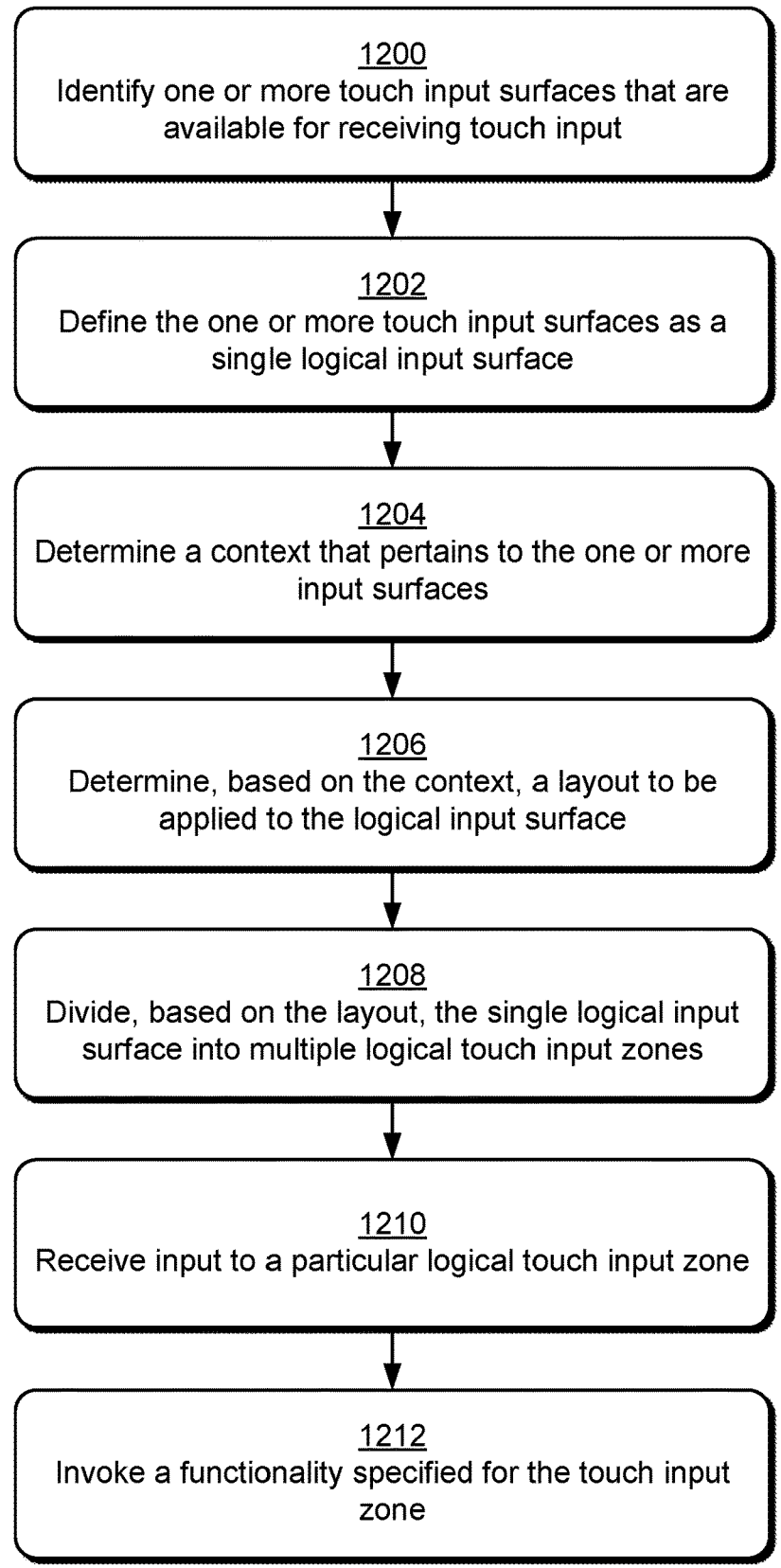
FIG. 12 is a flow diagram that describes steps in a method for configuring zones of a touch input surface.

FIG. 12 is a flow diagram that describes steps in a method in accordance with one or more implementations. The method describes an example procedure for configuring zones of a touch input surface. In at least some implementations, the method may be performed at least in part by the touch input module 116 and/or by the operating system 104.

Step 1200 identifies one or more touch input surfaces that are available for receiving touch input. The touch input module 116, for instance, determines a particular touch input device 118 and/or combination of touch input devices 118 that are available for receiving touch input. In at least one implementation, the touch input surfaces represent local touch input surfaces, such as the touchpad 128 and/or the display device 124. Alternatively or additionally, the touch input surfaces include multiple touch input devices with touch capability, such as the client device 102 combined with the external device 402.

Step 1202 defines the one or more touch input surfaces as a single logical input surface. For example, the touch input module 116 defines the one or more touch input surfaces as a single integrated logical surface that can be divided and re-divided based on different contextual factors. In an implementation where the touch input surfaces are implemented on multiple devices, the touch input module 116 generates a logical abstraction that represents the touch input surfaces as a single logical input surface.

Step 1204 determines a context that pertains to the one or more input surfaces. Examples of different types and instances of context information are described above. Generally, context data can be generated by a variety of different entities, such as the operating system 104, the applications 106, the I/O devices 108, the sensors 110, and so forth.

Step 1206 determines, based on the context, a layout to be applied to the logical input surface. The layout, for instance, specifies parameters for different touch input zones for the logical input surface, and zone functionalities that are to be applied to the touch input zones.

Step 1208 divides, based on the layout, the single logical input surface into multiple logical touch input zones. In at least some implementations, dividing a logical input surface into touch input zones refers to a logical operation of generating data that represents the logical input surface as multiple different logical input zones. As discussed above, the logical input surface can include a single contiguous surface, such as the touchpad 128 and/or the display device 124, that is divided into multiple different input zones. Alternatively or additionally, the logical input surface can include touch input surfaces across multiple different devices, such as devices that are interconnected via a wired and/or wireless connection. Further, each of the logical input zones is selectable to invoke a different respective functionality.

Step 1210 receives input to a particular logical touch input zone. The I/O module 112, for instance, detects touch input to the touch input zone.

Step 1212 invokes a functionality specified for the touch input zone. A particular zone functionality assigned to the touch input zone, for instance, is invoked. Generally, this can cause various types of actions, such input to the operating system 104, an application 106, and so forth.

Figure 13:
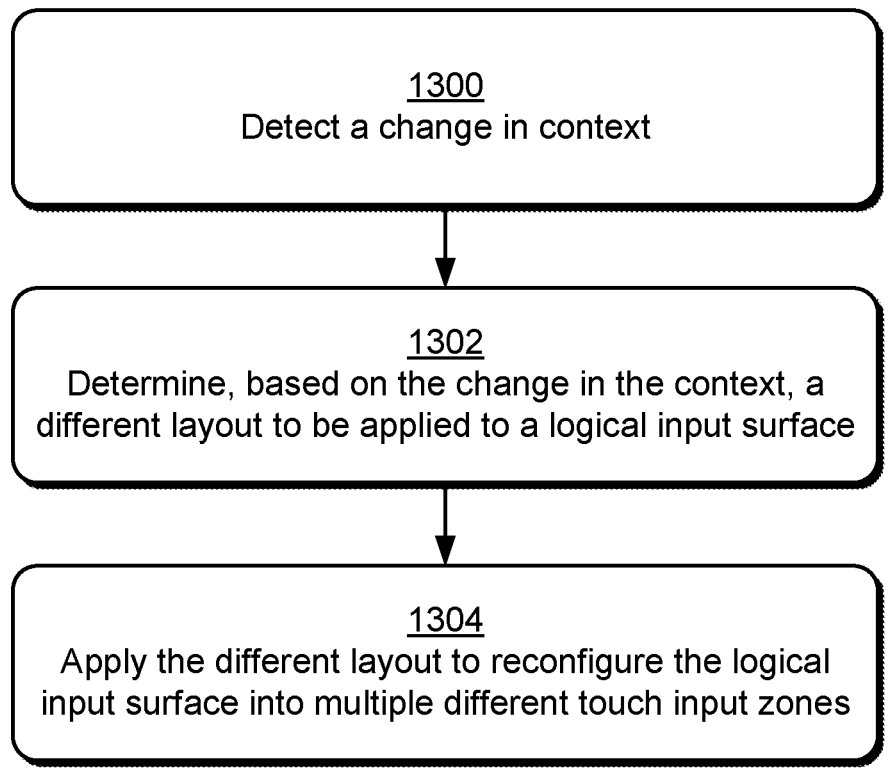
FIG. 13 is a flow diagram that describes steps in a method for reconfiguring zones of a touch input surface based on a change in context.

FIG. 13 is a flow diagram that describes steps in a method in accordance with one or more implementations. The method describes an example procedure for reconfiguring zones of a touch input surface based on a change in context. In at least some implementations, the method may be performed at least in part by the touch input module 116 and/or by the operating system 104. The method, for instance, represents an extension of the method described above.

Step 1300 detects a change in context. The touch input module 116, for instance, receives context information from a different functionality of the client device 102, and the context information indicates a change in context. In at least one implementation, the change in context occurs dynamically and while a device is in an active state.

Step 1302 determines, based on the change in the context, a different layout to be applied to a logical input surface. The logical input surface, for instance, was previously configured into different touch input zones and according to a particular device layout determined based on a previous context.

Step 1304 applies the different layout to reconfigure the logical input surface into multiple different touch input zones. For example, the logical input surface was previously configured into a set of touch input zones, and thus applying the different layout changes the touch input zone configuration of the logical input surface.

Figure 14:
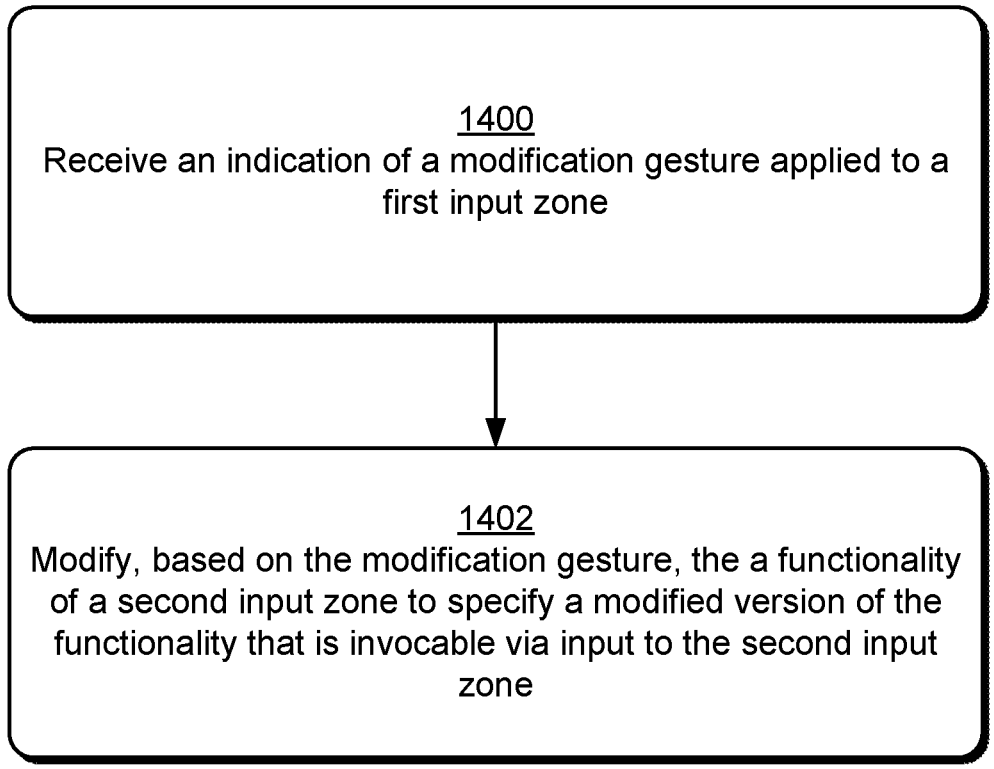
FIG. 14 is a flow diagram that describes steps in a method for modifying functionality of an input zone.

FIG. 14 is a flow diagram that describes steps in a method in accordance with one or more implementations. The method describes an example procedure for modifying functionality of an input zone.

Step 1400 receives an indication of a modification gesture applied to a first input zone. The gesture, for instance, is applied to an input zone of a touch input device that has been divided into different zones, such as described above.

Step 1402 modifies, based on the modification gesture, the a functionality of a second input zone to specify a modified version of the functionality that is invocable via input to the second input zone. For example, the gesture to the first input zone causes a default functionality of the second input zone to be modified to generate a customized functionality that is applied for the second input zone and while the gesture is applied to the first input zone. Additionally or alternatively, a gesture to a first input zone can modify a default functionality of a second input zone and after the gesture is performed on the first input zone, e.g., after the gesture is completed.

Figure 15:
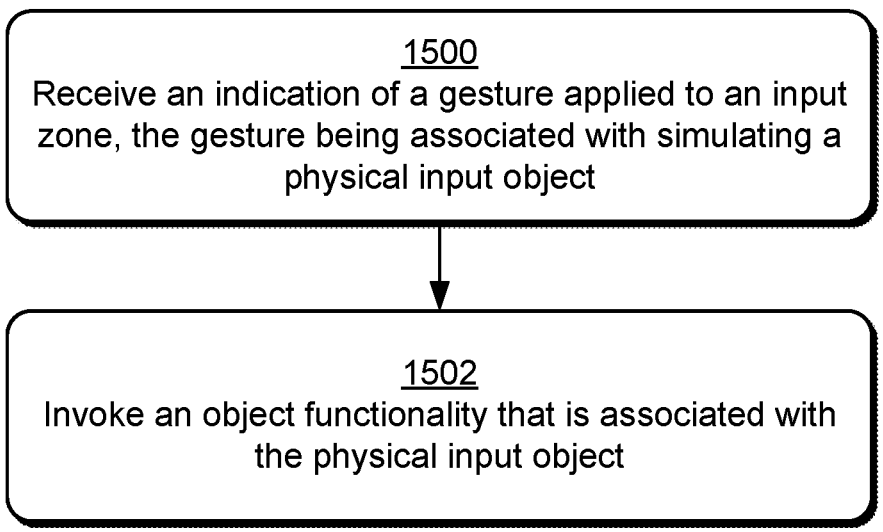
FIG. 15 is a flow diagram that describes steps in a method for simulating a physical input object.

FIG. 15 is a flow diagram that describes steps in a method in accordance with one or more implementations. The method describes an example procedure for simulating a physical input object.

Step 1500 receives an indication of a gesture applied to an input zone, the gesture being associated with simulating a physical input object. The gesture, for instance, is mapped in the gesture mappings 134 to a functionality that simulates the presence of a physical input object on a touch input device 118.

Step 1502 invokes an object functionality that is associated with the physical input object. For example, the object functionality represents a functionality that is invoked when the physical input object is present, such as in contact with a touch input device 118. Examples of the object functionality include an application interface, a system interface, and so forth.

Figure 16:
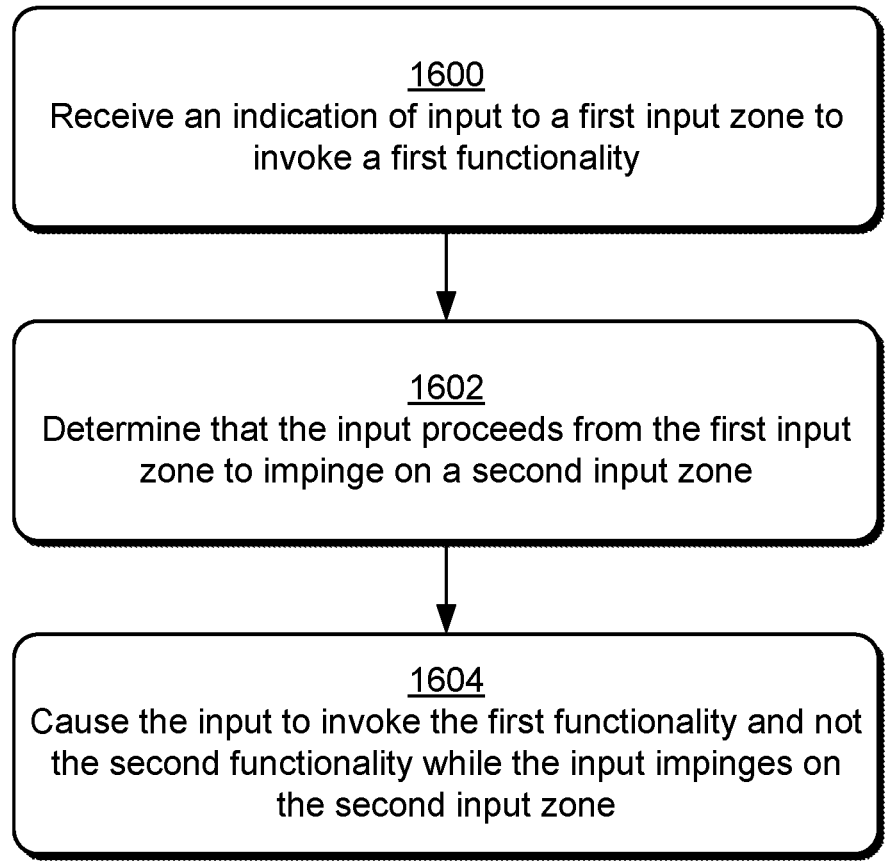
FIG. 16 is a flow diagram that describes steps in a method for compensating for variations in input.

FIG. 16 is a flow diagram that describes steps in a method in accordance with one or more implementations. The method describes an example procedure for compensating for variations in input.

Step 1600 receives an indication of input to a first input zone to invoke a first functionality. The touch input module 116, for instance, detects touch input to a particular input zone.

Step 1602 determines that the input proceeds from the first input zone to impinge on a second input zone. For example, the touch input module 116 detects that touch input moves from the first input zone into a second input zone adjacent the first.

Step 1604 causes the input to invoke the first functionality and not the second functionality while the input impinges on the second input zone. The touch input module 116, for instance, causes the functionality of the first input zone to be invoked, even though the input has moved at least partially into the second input zone. In at least some implementations, the first functionality continues to be invoked while the input is within a buffer zone within the second input zone. If the input moves past the buffer zone within the second input zone, however, a different functionality may be invoked instead of the first functionality.

Figure 17:
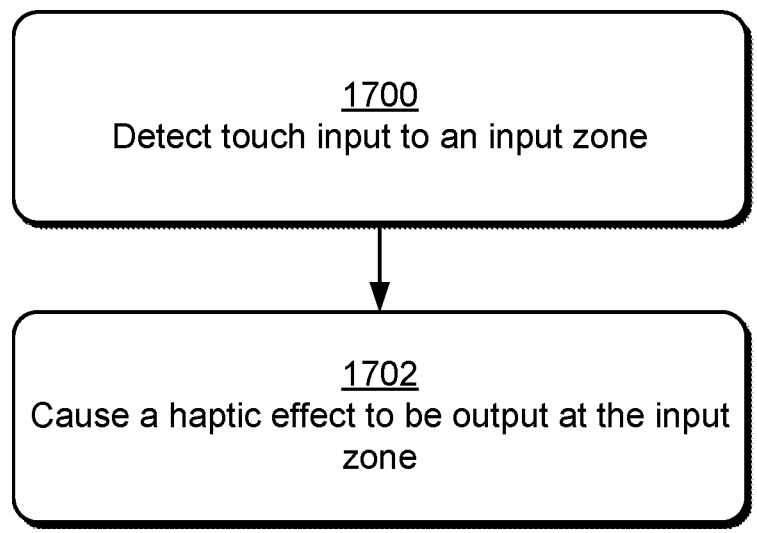
FIG. 17 is a flow diagram that describes steps in a method for causing a haptic effect in an input zone.

FIG. 17 is a flow diagram that describes steps in a method in accordance with one or more implementations. The method describes an example procedure for causing a haptic effect in an input zone.

Step 1700 detects touch input to an input zone. The touch input module 116, for instance, detects that touch input is applied to a particular input zone.

Step 1702 causes a haptic effect to be output at the input zone. For example, the touch input module 116 determines a particular haptic effect for the input zone, such as by mapping an identifier for the input zone to a corresponding haptic effect specified in the haptic profiles 136. In at least one implementation, the touch input module 116 communicates parameters for the haptic effect to a haptic output device 122 to cause the haptic effect to be output by the haptic output device 122.

Additionally or alternatively to providing haptic effects at an input zone that receives touch input, touch input to a particular input zone can cause a haptic effect and/or combination of haptic effects at other input zones. For instance, touch input to a first input zone can cause a haptic effect to be output at a second input zone, and/or haptic effects at a combination of a second input zone and a third input zone. Further, a gesture that spans multiple input zones can cause haptic effects across the input zones, and/or at another input zone not involved in the gesture. Thus, various combinations of haptic effects can be output to correspond to different input zones and different gestures.

Accordingly, techniques discussed herein enable touch input devices to be configured and reconfigured based on a wide variety of different contextual scenarios.

Having discussed some example procedures, consider now a discussion of an example system and device in accordance with one or more embodiments.

Example System and Device

Figure 18:
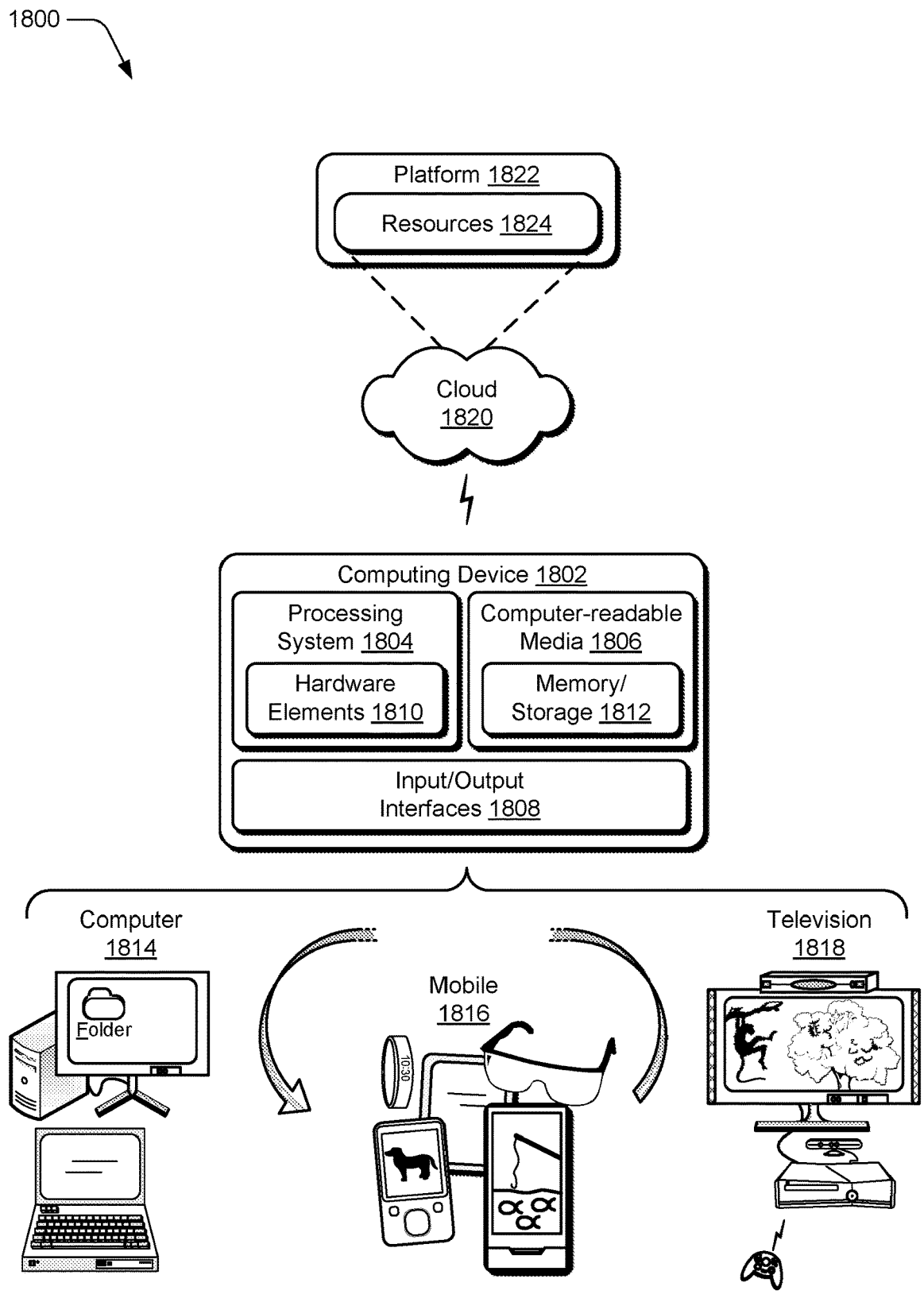
FIG. 18 illustrates an example system and computing device as described with reference to FIG. 1, which are configured to implement embodiments of techniques described herein.

FIG. 18 illustrates an example system generally at 1800 that includes an example computing device 1802 that is representative of one or more computing systems and/or devices that may implement various techniques described herein. For example, the client device 102 discussed above with reference to FIG. 1 can be embodied as the computing device 1802. The computing device 1802 may be, for example, a server of a service provider, a device associated with the client (e.g., a client device), an on-chip system, and/or any other suitable computing device or computing system.

The example computing device 1802 as illustrated includes a processing system 1804, one or more computer-readable media 1806, and one or more Input/Output (I/O) Interfaces 1808 that are communicatively coupled, one to another. Although not shown, the computing device 1802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware element 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1806 is illustrated as including memory/storage 1812. The memory/storage 1812 represents memory/storage capacity associated with one or more computer-readable media. The memory/storage 1812 may include volatile media (such as random access memory (RAM)) and/or nonvolatile media (such as read only memory (ROM), Flash memory, optical disks, magnetic disks, and so forth). The memory/storage 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1810 and computer-readable media 1806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of modules that are executable by the computing device 1802 as software may be achieved at least partially in hardware, e.g., through use of computer-readable storage media and/or hardware elements 1810 of the processing system. The instructions and/or functions may be executable/operable by one or more articles of manufacture (for example, one or more computing devices 1802 and/or processing systems 1804) to implement techniques, modules, and examples described herein.

As further illustrated in FIG. 18, the example system 1800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1802 may assume a variety of different configurations, such as for computer 1814, mobile 1816, and television 1818 uses. Each of these configurations includes devices that may have generally different constructs and capabilities, and thus the computing device 1802 may be configured according to one or more of the different device classes. For instance, the computing device 1802 may be implemented as the computer 1814 class of a device that includes a personal computer, desktop computer, a multi-screen computer, laptop computer, netbook, and so on.

The computing device 1802 may also be implemented as the mobile 1816 class of device that includes mobile devices, such as a mobile phone, portable music player, portable gaming device, a tablet computer, a wearable device, a multi-screen computer, and so on. The computing device 1802 may also be implemented as the television 1818 class of device that includes devices having or connected to generally larger screens in casual viewing environments. These devices include televisions, set-top boxes, gaming consoles, and so on.

The techniques described herein may be supported by these various configurations of the computing device 1802 and are not limited to the specific examples of the techniques described herein. For example, functionalities discussed with reference to the touch input module 116 may be implemented all or in part through use of a distributed system, such as over a "cloud" 1820 via a platform 1822 as described below.

The cloud 1820 includes and/or is representative of a platform 1822 for resources 1824. The platform 1822 abstracts underlying functionality of hardware (e.g., servers) and software resources of the cloud 1820. The resources 1824 may include applications and/or data that can be utilized while computer processing is executed on servers that are remote from the computing device 1802. Resources 1824 can also include services provided over the Internet and/or through a subscriber network, such as a cellular or Wi-Fi network.

The platform 1822 may abstract resources and functions to connect the computing device 1802 with other computing devices. The platform 1822 may also serve to abstract scaling of resources to provide a corresponding level of scale to encountered demand for the resources 1824 that are implemented via the platform 1822. Accordingly, in an interconnected device embodiment, implementation of functionality described herein may be distributed throughout the system 1800. For example, the functionality may be implemented in part on the computing device 1802 as well as via the platform 1822 that abstracts the functionality of the cloud 1820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. The steps described in the methods, for instance, represent logic executed by a processor to perform the various actions described by the steps and their associated details. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for dividing a touch input surface into touch input zones, the system including: at least one processor; and one or more computer-readable storage media including instructions stored thereon that, responsive to execution by the at least one processor, cause the system perform operations including: identifying one or more touch input surfaces that are available for receiving touch input; determining, based on a context that pertains to the one or more touch input surfaces, a layout to be applied to the one or more touch input surfaces; and dividing, based on the layout, the one or more touch input surfaces into multiple touch input zones, the multiple touch input zones including a first input zone and a second input zone and the first input zone being selectable to invoke a first functionality and the second input zone being selectable to invoke a second functionality that is different than the first functionality.

In addition to any of the above described systems, any one or combination of: wherein the one or more touch input surfaces include a single touchpad surface, and wherein said dividing includes dividing the single touchpad surface into the multiple touch input zones; wherein the one or more touch input surfaces include a sub-region of a display device, and wherein said dividing includes dividing the sub-region of a display device into the multiple touch input zones; wherein the one or more touch input surfaces include a first touch input surface on a first device and a second touch input surface on a second device that is external to the first device; wherein the one or more touch input surfaces include a first touch input surface on a first device and a second touch input surface on a second device that is external to the first device, and wherein the first input zone is positioned on the first touch input surface, and the second input zone is positioned on the second input surface; wherein the one or more touch input surfaces include a first touch input surface on a first device and a second touch input surface on a second device that is connected to the first device via a wireless connection; wherein the one or more touch input surfaces include a first display device and a second display device connected to the first display device via a hinge; wherein the one or more touch input surfaces include a first display device and a second display device connected to the first display device via a hinge, and wherein the context includes an indication of a posture of the first display device relative to the second display device; wherein the operations further include: receiving an indication of a modification gesture applied to the first input zone; and modifying, based on the modification gesture, the second functionality to specify a modified version of the second functionality that is invocable via input to the second input zone; wherein the operations further include specifying a first haptic effect for the first input zone and a second, different haptic effect for the second input zone; wherein the operations further include: receiving an indication of a gesture applied to the first input zone, the gesture being associated with simulating a physical input object; and invoking an object functionality that is associated with the physical input object; wherein the first input zone and the second input zone are adjacent one another, and wherein the operations further include: receiving an indication of input to the first input zone to invoke the first functionality; determining that the input proceeds from the first input zone to impinge on the second input zone; and causing the input to invoke the first functionality and not the second functionality while the input impinges on the second input zone; wherein the operations further include: determining, based on the change in the context, a different layout to be applied to the one or more touch input surfaces; and applying the different layout to divide the one or more touch input surfaces into multiple different touch input zones.

A computer-implemented method for dividing a touch input surface into touch input zones, the method including: defining one or more touch input surfaces as a single logical input surface; determining, based on a context that pertains to the one or more touch input surfaces and by a processing system executing logic, a layout to be applied to the logical input surface; and dividing, based on the layout and by the processing system executing logic, the single logical input surface into multiple logical touch input zones.

In addition to any of the above described methods, any one or combination of: wherein the one or more touch input surfaces include a touchpad surface, and wherein said dividing includes dividing the touchpad surface into the multiple logical touch input zones, the multiple logical touch input zones including a first input zone that is selectable to invoke a first functionality, and a second input zone that is selectable to invoke a second functionality that is different than the first functionality; wherein the one or more touch input surfaces include a first touch input surface on a first device and a second touch input surface on a second device that is external to the first device; further including: determining, based on the change in the context, a different layout to be applied to the logical input surface; and applying the different layout to divide the logical input surface into multiple different touch input zones; wherein the logical touch input zones include a first input zone and a second input zone, and wherein the method further includes specifying a first haptic effect for the first input zone and a second, different haptic effect for the second input zone.

A computer-implemented method for dividing an input surface into touch input zones, the method including: defining one or more touch input surfaces as a single logical input surface; determining, based on a context that pertains to the one or more touch input surfaces, a layout to be applied to the logical input surface; dividing, based on the layout, the logical input surface into multiple touch input zones; determining, based on a change in the context, a different layout to be applied to the logical input surface; and applying the different layout to divide the logical input surface into multiple different touch input zones.

In addition to any of the above described methods, any one or combination of: wherein the one or more input surfaces include a first touch input surface on a first device and a second touch input surface on a second device that is external to the first device.

CONCLUSION

Techniques for layout for a touch input surface are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one processor; and
   one or more computer-readable storage media including instructions stored thereon that, responsive to execution by the at least one processor, cause the system perform operations including:
     identifying one or more touch input surfaces that are available for receiving touch input;
     determining, based on an evaluation of context data that comprises display position information of one or more displays associated with the system and application state information for one or more applications executing on the system, a layout to be applied to the one or more touch input surfaces; and
     dividing, based on the layout determined from the evaluation of the context data, the one or more touch input surfaces into multiple touch input zones, the multiple touch input zones including a first input zone and a second input zone and the first input zone being selectable to invoke a first functionality and the second input zone being selectable to invoke a second functionality that is different than the first functionality.

2. A system as recited in claim 1, wherein the one or more touch input surfaces comprise a single touchpad surface, and wherein said dividing comprises dividing the single touchpad surface into the multiple touch input zones.

3. A system as recited in claim 1, wherein the one or more touch input surfaces comprise a sub-region of a display device, and wherein said dividing comprises dividing the sub-region of the display device into the multiple touch input zones.

4. A system as recited in claim 1, wherein the one or more touch input surfaces comprise a first touch input surface on a display associated with a first device and a second touch input surface on a display associated with a second device that is external to the first device.

5. A system as recited in claim 1, wherein the one or more touch input surfaces comprise a first touch input surface on a display associated with a first device and a second touch input surface on a display associated with a second device that is external to the first device, and wherein the first input zone is positioned on the first touch input surface, and the second input zone is positioned on the second input surface.

6. A system as recited in claim 1, wherein the one or more touch input surfaces comprise a first touch input surface on a display associated with a first device and a second touch input surface on a display associated with a second device that is connected to the first device via a wireless connection.

7. A system as recited in claim 1, wherein the one or more touch input surfaces comprise a first display device and a second display device connected to the first display device via a hinge.

8. A system as recited in claim 1, wherein the one or more touch input surfaces comprise a first display device and a second display device connected to the first display device via a hinge, and wherein the context data comprises an indication of a posture of the first display device relative to the second display device.

9. A system as recited in claim 1, wherein the operations further include:
- receiving an indication of a modification gesture applied to the first input zone; and
- modifying, based on the modification gesture, the second functionality to specify a modified version of the second functionality that is invocable via input to the second input zone.

10. A system as recited in claim 1, wherein the operations further include specifying a first haptic effect for the first input zone and a second, different haptic effect for the second input zone.

11. A system as recited in claim 1, wherein the operations further include:
- receiving an indication of a gesture applied to the first input zone, the gesture being associated with simulating a physical input object; and
- invoking an object functionality that is associated with the physical input object.

12. A system as recited in claim 1, wherein the first input zone and the second input zone are adjacent one another, and wherein the operations further include:
- receiving an indication of input to the first input zone to invoke the first functionality;
- determining that the input proceeds from the first input zone to impinge on the second input zone; and
- causing the input to invoke the first functionality and not the second functionality while the input impinges on the second input zone.

13. A system as recited in claim 1, wherein the operations further include:
- determining, based on the change in the context data, a different layout to be applied to the one or more touch input surfaces; and
- applying the different layout to divide the one or more touch input surfaces into multiple different touch input zones.

14. A computer-implemented method, comprising:
- defining one or more touch input surfaces as a logical input surface;
- determining, based on an evaluation of context data that comprises display position information of one or more displays associated with a computing device and application state information for one or more applications executing on the computing device, a layout to be applied to the logical input surface; and
- dividing, based on the layout determined from the evaluation of the context data, the logical input surface into multiple logical touch input zones.

15. A method as described in claim 14, wherein the one or more touch input surfaces comprise a touchpad surface, and wherein said dividing comprises dividing the touchpad surface into the multiple logical touch input zones, the multiple logical touch input zones including a first input zone that is selectable to invoke a first functionality, and a second input zone that is selectable to invoke a second functionality that is different than the first functionality.

16. A method as described in claim 14, wherein the one or more touch input surfaces comprise a first touch input surface on a first display device associated with the computing device and a second touch input surface on a second display device that is external to the first display device.

17. A method as recited in claim 14, further comprising:
- determining, based on the change in the context data, a different layout to be applied to the logical input surface; and
- applying the different layout to divide the logical input surface into multiple different touch input zones.

18. A method as recited in claim 14, wherein the logical touch input zones include a first input zone and a second input zone, and wherein the method further comprises specifying a first haptic effect for the first input zone and a second, different haptic effect for the second input zone.

19. A computer-implemented method, comprising:
- defining one or more touch input surfaces as a single logical input surface;
- determining, based on a context data that comprises display position information of one or more displays associated with a computing device and application state information for one or more applications executing on the computing device, a layout to be applied to the single logical input surface;
- dividing, based on the layout determined from the evaluation of the context data, the single logical input surface into multiple touch input zones;
- determining, based on a change in the context data, a different layout to be applied to the single logical input surface; and
- applying the different layout to divide the single logical input surface into multiple different touch input zones.

20. A system as recited in claim 19, wherein the one or more input surfaces comprise a first touch input surface on a first display device and a second touch input surface on a second display device that is external to the first display device.

* * * * *